(12) United States Patent
Mao

(10) Patent No.: US 12,549,079 B2
(45) Date of Patent: Feb. 10, 2026

(54) HIGH EFFICIENCY HIGH DENSITY MOTOR AND GENERATOR WITH MULTIPLE AIRGAPS AND INTERLEAVED MAGNETIC STRUCTURES

(71) Applicant: Quantentech Limited, Grand Cayman (KY)

(72) Inventor: Hengchun Mao, Allen, TX (US)

(73) Assignee: Quantentech Limited, Grand Cayman (KY)

( * ) Notice: Subject to any disclaimer, the term of this patent is extended or adjusted under 35 U.S.C. 154(b) by 233 days.

(21) Appl. No.: 18/427,504

(22) Filed: Jan. 30, 2024

(65) Prior Publication Data

US 2024/0171053 A1     May 23, 2024

Related U.S. Application Data

(63) Continuation-in-part of application No. 17/407,273, filed on Aug. 20, 2021, now Pat. No. 11,923,733.

(60) Provisional application No. 63/071,474, filed on Aug. 28, 2020.

(51) Int. Cl.
*H02K 16/02* (2006.01)
*H02K 3/28* (2006.01)

(52) U.S. Cl.
CPC ............ *H02K 16/02* (2013.01); *H02K 3/28* (2013.01)

(58) Field of Classification Search
CPC ................................ H02K 3/28; H02K 16/02

USPC ......................................................... 310/114
See application file for complete search history.

(56) References Cited

U.S. PATENT DOCUMENTS

| | | | | |
|---|---|---|---|---|
| 2004/0251759 | A1* | 12/2004 | Hirzel | H02K 21/14 310/156.25 |
| 2009/0309442 | A1* | 12/2009 | Qu | H02K 21/24 310/156.48 |
| 2019/0058431 | A1* | 2/2019 | Mao | H02K 3/28 |
| 2022/0069685 | A1* | 3/2022 | Mao | H02K 17/14 |
| 2022/0094220 | A1* | 3/2022 | Islam | H02K 1/16 |
| 2023/0353025 | A1* | 11/2023 | Hagnestål | H02K 1/16 |

* cited by examiner

*Primary Examiner* — Rashad H Johnson
(74) *Attorney, Agent, or Firm* — AP3 Law Firm PLLC

(57) ABSTRACT

An apparatus has a stator having a first surface and a second surface, and a plurality of rotors magnetically coupled to the stator, with a first rotor facing the first surface of the stator through a first airgap and a second rotor facing the second surface of the stator through a second airgap. First slots, each containing first conductors and separated from each other by a first tooth, are distributed along the first surface. Second slots, each containing second conductors and separated from each other by a second tooth, is distributed along the second surface, where each second tooth is separated from a close-by first tooth by a yoke area. The first teeth are interleaved with the second teeth. Windings are configured using the first conductors and the second conductors. The first rotor and the second rotor are configured to produce mechanical torque in a same direction when currents flow in the windings in an operation mode.

20 Claims, 25 Drawing Sheets

1100

First Section

| Slot # | S1 | S2 | S3 | S4 | S5 | S6 | S7 | S8 | S9 | S10 | S11 | S12 | S13 | S14 | S15 | S16 | S17 | S18 |
|---|---|---|---|---|---|---|---|---|---|---|---|---|---|---|---|---|---|---|
| First Coil | I | A | B | B | C | C | D | D | E | F | F | G | G | H | H | I | I |
| Second Coil | A | A | A | B | C | C | D | D | E | E | F | F | G | G | H | H | I | I |

Second Section

| Slot # | S19 | S20 | S21 | S22 | S23 | S24 | S25 | S26 | S27 | S28 | S29 | S30 | S31 | S32 | S33 | S34 | S35 | S36 |
|---|---|---|---|---|---|---|---|---|---|---|---|---|---|---|---|---|---|---|
| First Coil | I | A | B | B | C | C | D | D | E | F | F | G | G | H | H | I | I |
| Second Coil | A | A | A | B | C | C | D | D | E | E | F | F | G | G | H | H | I | I |

Figure 11

HIGH EFFICIENCY HIGH DENSITY MOTOR AND GENERATOR WITH MULTIPLE AIRGAPS AND INTERLEAVED MAGNETIC STRUCTURES

CROSS REFERENCE TO RELATED APPLICATIONS

This application is a continuation-in-part of U.S. patent application Ser. No. 17/407,273 titled "High Efficiency High Density Motor and Generator with Multiple Airgaps", filed on Aug. 20, 2021, which is related to and claims priority to U.S. Provisional Application No. 63/071,474, titled, "High Efficiency High Density Motor and Generator with Multiple Airgaps" filed on Aug. 28, 2020, which is herein incorporated by reference.

TECHNICAL FIELD

The present invention relates to electrical motors and generators, and electrical drives and controls, and, in particular embodiments, to novel motor and generator structures, and the use of novel power electronics equipment and control mechanism to drive and control them.

BACKGROUND

Electric machines (including motors and generators) are an apparatus converting energy between electric supply and mechanical motion. There are different types of electric machines, including induction machine, permanent magnets machines, switching reluctance machines, synchronous reluctance machines, and hybrid machines, with rotational, linear or other patterns of mechanical movement. The various embodiments in this disclosure are applicable to all types of electrical machines, including the above types of electric machines as both motors and generators, but motors as an example will be used to illustrate the innovative aspects of the present disclosure. The technologies disclosed will be discussed with a rotary machine as an example, but they can also be applied to machines with other forms of movement, such as linear machines. In most applications motors and generators operate at variable speed. Power electronics equipment is used to operate with the motors and generators in such variable speed systems, including but not limited to industrial drives, electrical vehicles, diesel-generator sets, and wind power generation. There is a strong desire to increase the efficiency of such systems, while reducing its cost and size, especially for demanding applications such as electrical cars and other transportation equipment.

A motor or generator usually comprises a stator and a rotor. The stator is the stationary part, and the rotor is the rotating or moving part, which may rotate or move in linear or other fashion against the stator, depending on the mechanical design. The rotor may be inside the stator, outside the stator, or beside the stator as in an axial field machine. A small airgap exists between the rotor and the stator for mechanical clearance and mechanical torque generation, and it is where the electro-mechanical energy conversion occurs. To improve the performance, it is desirable to be able to have multiple airgaps in a motor or generator. Unfortunately, so far, such multi airgap motors and generators are not widely used because the design and control of such a system are too difficult and complex. Significant improvement is needed to further optimize system performance and reduce the system cost.

SUMMARY OF THE INVENTION

These and other problems are generally solved or circumvented, and technical advantages are generally achieved, by preferred embodiments of the present invention which provides an improved motor/generator and drive systems.

In accordance with an embodiment, an apparatus has a stator having a first surface and a second surface, and a plurality of rotors magnetically coupled to the stator, with a first rotor of the plurality of rotors facing the first surface of the stator through a first airgap and a second rotor of the plurality of rotors facing the second surface of the stator through a second airgap. A plurality of first slots, each containing a plurality of first conductors and separated from each other by a first tooth, is distributed along the first surface, and a plurality of second slots, each containing a plurality of second conductors and separated from each other by a second tooth, is distributed along the second surface, where each second tooth is separated from a close-by first tooth by a yoke area, and the first teeth are interleaved with the second teeth. A plurality of windings is configured using the first conductors and the second conductors. The plurality of first conductors, the first airgap, and the first rotor form a first submotor. The plurality of second conductors, the second airgap, and the second rotor form a second submotor. The first rotor and the second rotor are configured to produce mechanical torque in a same direction when currents flow in the plurality of windings in an operation mode. In accordance with another embodiment, a system includes a stator having a first surface and a second surface, and a plurality of rotors magnetically coupled to the stator, with a first rotor of the plurality of rotors facing the first surface of the stator through a first airgap and a second rotor of the plurality of rotors facing the second surface of the stator through a second airgap. A plurality of first slots, each containing a plurality of first conductors and separated from each other by a first tooth, is distributed along the first surface, and a plurality of second slots, each containing a plurality of second conductors and separated from each other by a second tooth, is distributed along the second surface, where each second tooth is separated from a close-by first tooth by a yoke area, and the first teeth are interleaved with the second teeth. A plurality of windings is configured using the first conductors and the second conductors. The plurality of first conductors, the first airgap, and the first rotor form a first submotor. The plurality of second conductors, the second airgap, and the second rotor form a second submotor. The system further includes a plurality of power converters coupled to the plurality of windings, and the plurality of power converters are configured to control currents in the plurality of windings so that the first rotor and the second rotor produce mechanical torque in a same direction in an operation mode.

In accordance with yet another embodiment, a method a includes providing a stator with a first surface and a second surface, distributing a plurality of first slots along the first surface, where each first slot contains a plurality of first conductors and is separated from each other by a first tooth, distributing a plurality of second slots along the second surface, where each second slot contains a plurality of second conductors and is separated from each other by a second tooth, separating each second tooth from a close-by first tooth by a yoke area, and interleaving the first teeth with the second teeth. The method also includes arranging a plurality of windings using the first conductors and the second conductors, and providing a plurality of rotors magnetically coupled to the stator, where a first rotor of the plurality of rotors faces the first surface of the stator through a first airgap and a second rotor of the plurality of rotors faces the second surface of the stator through a second airgap. The method further includes configuring the plurality of first conductors, the first airgap, and the first rotor to form a first submotor, and configuring the plurality of second conductors, the second airgap, and the second rotor to form a second submotor such that the first rotor and the second rotor produce mechanical torque in a same direction in an operation mode.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 11 illustrates a winding arrangement in slots of a motor in accordance with various embodiments of the present disclosure;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 1:
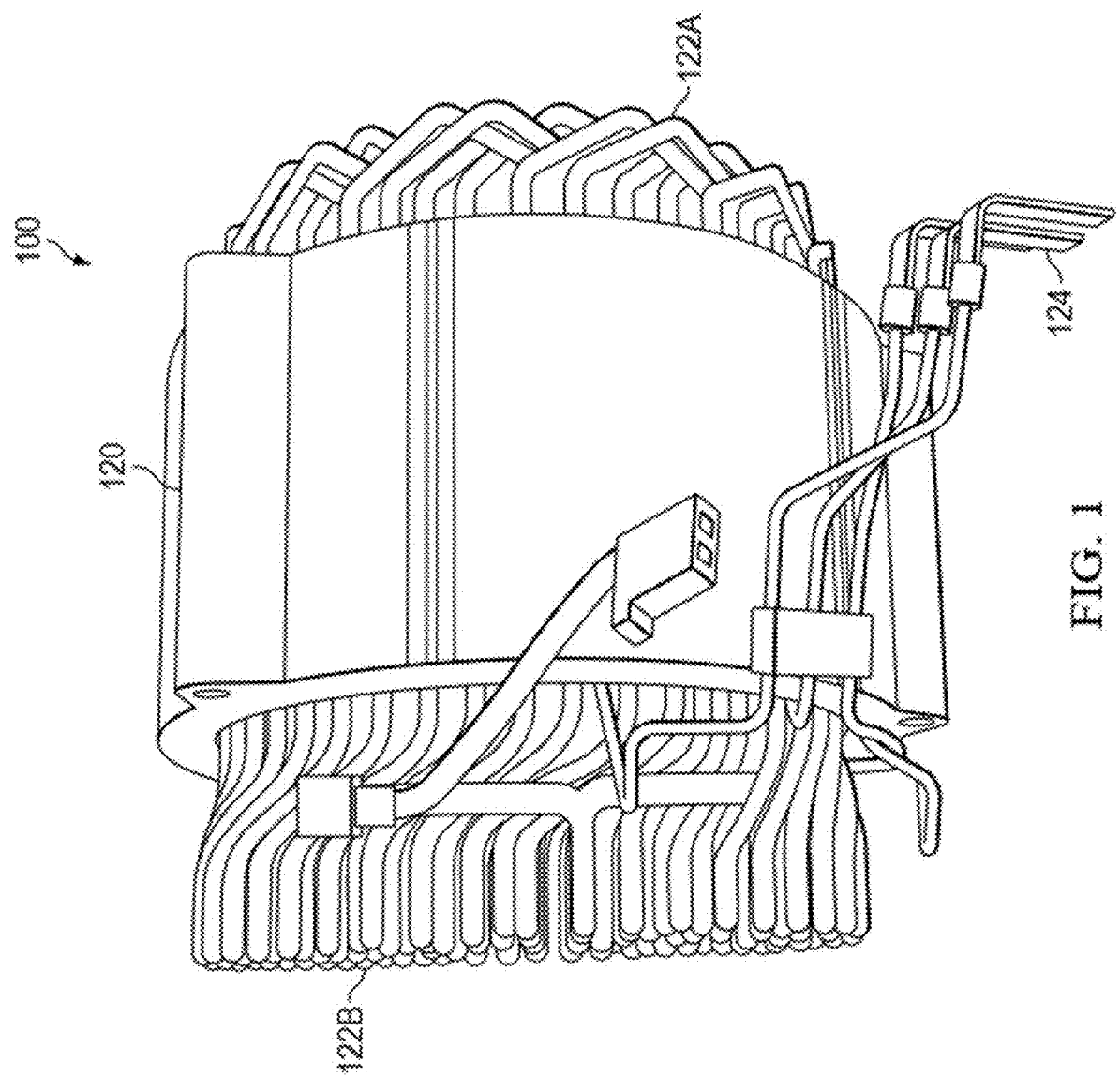
FIG. 1 illustrates the stator of a motor.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely in a motor and motor drive system. The invention may also be applied, however, to a variety of other electrical machine and machine control systems, including generators, rectifiers, and inverters, and any combination thereof. Hereinafter, various embodiments will be explained in detail with reference to the accompanying drawings.

A squirrel-cage induction motor is used mainly as an example to illustrate the innovative aspects of the present disclosure, but the innovations disclosed in this disclosure can also be applied to other motor and generators.

The stator of a squirrel cage inductor motor comprises a plurality of windings embedded in a stator core, usually made of silicon steel laminates, ferrites, powder iron or other magnetic materials. The windings are organized into a plurality of phases arranged in pole pairs. Usually, the number of phases and the number of poles are fixed in a motor. Mao etc. disclosed a dynamically reconfigurable technology in U.S. Pat. Nos. 9,240,748, 9,490,740, 9,800,193 etc. and US patent applications 20190058364, 20190058430, 20200204099 etc., which modifies the number of poles and number of phases of a motor through current control to optimize the motor design and motor performance across a wide operating range. The rotor of the squirrel cage induction motor comprises a rotor core and a squirrel cage made of metal bars which are inside the rotor core, usually comprising magnetic materials usually similar to the stator core's. A shaft is located usually in the middle of rotor and is surrounded by the metal bars and the rotor core to provide mechanical output to a load. First ends of the metal bars are shorted together by a first interconnect ring. Second ends of the metal bars are shorted together by a second interconnect ring. In operation, the electric power is usually applied to the stator, and sometimes to the rotor also. As a result, a first magnetic field is created in the stator and in the airgap, which rotates in time at a synchronous speed with alternating current (ac) power applied to the stator windings. The first magnetic field induces electric currents in the metal bars of the rotor. The induced currents produce a second magnetic field in the rotor and the airgap. According to Lenz's Law, the rotor follows the rotating first magnetic field and generates a mechanical torque pulling the rotor into rotation. In a motor mode, the rotor will fall behind the first magnetic field. The torque of the motor is approximately proportional to the slip between the speed of the first magnetic field—the synchronous speed and the speed of the rotor. The synchronous speed (in RPM) of the rotating magnetic field in a motor is equal to the frequency of the electric power supply times 60 and further divided by the number of pole pairs.

Motors are widely used in applications such as electric and hybrid vehicles, drones, ships, aircrafts and wind turbine generators. Power density/torque density, energy efficiency, size/weight and cost are usually conflicting objectives in a motor design. It would be desirable to have a motor system exhibiting a good performance such as high efficiency over a wide speed and power range at a low cost with reduced motor size. These and other problems are generally solved or circumvented, and technical advantages are generally achieved, by preferred embodiments of the present disclosure which provide a high efficiency motor or generator with multiple airgaps (rotors) and improved winding arrangements, at much higher power and torque density.

The control of the winding currents can be achieved through coupling a plurality of power converters to the windings of the motor. A suitable control algorithm is employed to control and improve the operation of the plurality of power converters in accordance with the operation condition. As a result, the motor and the associated motor drive system become a software defined system. The operation and performance of the software defined system can be improved over a wide range of operating conditions and with simulated and/or actual operation data through a self-learning and optimizing algorithm with real-time software update capability, thereby resulting in much better performance and cost tradeoffs. The benefits of the software defined system are especially significant for systems with complex operation modes such electrical vehicles. For example, the performance and function of the system can be modified or improved over time with regular or irregular update of the software used, through over-the-air (OTA) update, which can be offered as a service. In the update motor related parameters and motor control strategies can be modified. Such update may include improvement derived from a large body of data from small or big group of users, which can be stored, processed and managed in clouds.

In addition, the energy efficiency, reliability and the cost of a motor and/or motor control system can be improved simultaneously by applying the technology presented in this disclosure. For example, the system can continue to operate even though some windings in the motor, or some parts in a power converter are failed, as the failed parts or failed windings can be isolated and disabled with the rest of the system still working. It is also feasible to disable some power converters and/or some windings to make the system operate with a reduced number of phases to improve system efficiency at light load, similar to the phase-shading technique used in dc-dc converters.

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a motor/generator with multiple airgaps and various innovative arrangements of stator windings, as well as stators, rotors and multiple airgaps between them, which may be also compatible with dynamical reconfiguration technology of motor/generator to exhibit good performance across a wide operating range. The motor will have much better power, torque and efficiency due to better space and material utilization with multiple airgaps inside it. Also, a dynamically reconfigurable induction motor (DRIM) system/technology for improving motors by dynamically changing the number of poles and/or the number of phases through various power electronics control mechanisms will also be discussed with the innovative arrangements. It should be noted that the general principles of the innovative aspects in this disclosure may be also applied to electric machines with a fixed number of poles and/or phases. There are different types of electric machines including induction machines, permanent magnets machines, switching reluctance machines, synchronous reluctance machines, and hybrid machines. The various embodiments in this disclosure are applicable to such machines and machine systems. For example, a stator may also have permanent magnets or other features to improve its operation. This disclosure presents further improvements in motor/generator design, control and manufacturing processes. Although the discussion uses a motor as an example, the same principles can be applicable to generators. Hereinafter, various embodiments will be explained in detail with reference to the accompanying drawings.

FIG. 1 illustrates a picture of the stator of a state-of-the-art motor 100, with the housing and other mechanical parts removed. The stator core 120 usually comprises silicon steel laminates, and sometimes ferrites, power iron or other magnetic-conducting materials. In addition to conduct and shape magnetic fields, it provides also mechanical support and cooling to windings embedded in the stator and the rotor around the stator. Usually, a plurality of slots is cut in the stator core 120 evenly along a perimeter facing an airgap. The portion of stator core between the slots are called tooth, and the portion of stator core outside the slots is called yoke and is labeled 106. A stator winding (which may have single or multiple turns) comprises a plurality of coils, each placed in two slots of the stator core 120. A coil usually is in an enclosed shape with end conductors (all end conductors are sometimes called end windings). Different coils belonging to the same phase and located in neighboring slots are usually connected in series to form a subphase winding, and different subphase windings belonging to the same phase may be connected in series or in parallel to form a phase winding. The active portion of the stator windings which contributes to the power/energy conversion is located inside the stator core 120 and thus cannot be seen in the picture. The inactive portion of the stator windings, which doesn't contribute to the energy transfer directly and only serves as a connection means for the active portion, is usually called end windings, and is shown as 122A and 122B. If the coils are pre-formed such as in hair-pin windings, end windings 122A are part of a coil and manufactured together, and 122B can be considered connection wires between different pre-formed coils. The output leads 124 connect the windings of the phases (phase windings) to appropriate power sources, such as coupled to a power converter or inverter. Usually, the end windings take about 50% of stator's length, i.e. about 50% of a conventional motor's stator volume has no contribution to torque generation directly. This is one of the major shortcomings to be overcome by the technologies presented in this disclosure.

Figure 2:
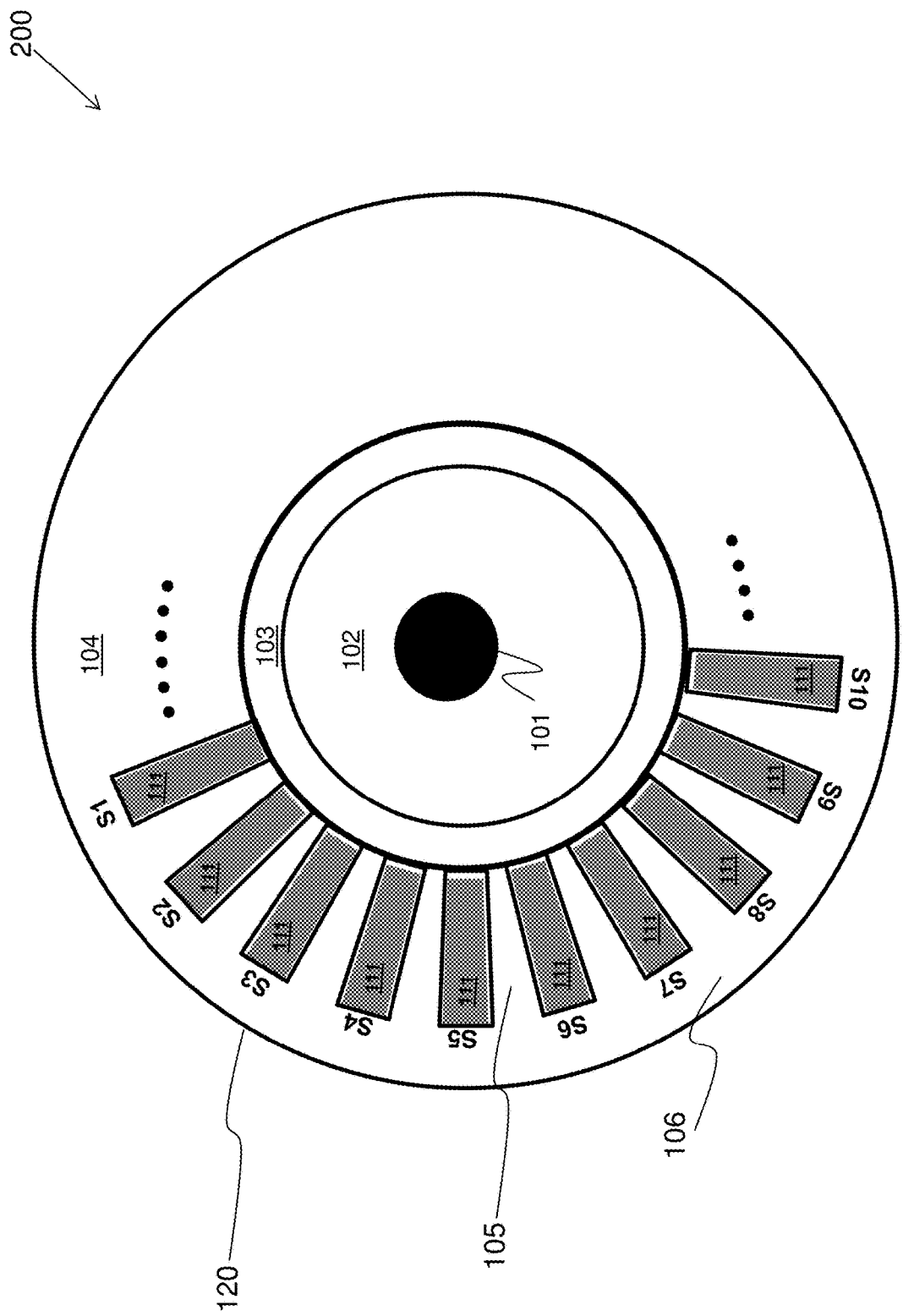
FIG. 2 illustrates a cross section view of a motor.

FIG. 2 is a cross section view of the motor shown in FIG. 1. The motor 200 shown in FIG. 2 comprises a stator 100 and a rotor 102 located inside and surrounded by the stator 100. An airgap 103 is located between the stator 100 and the rotor 102. The stator 100 comprises a stator core 120 with a plurality of stator slots designated as S1, S2, S3 etc. In each slot a plurality of electrical conductors (stator conductors) 111 is located within, and these stator conductors are organized into a plurality of stator windings. The plurality of stator slots/conductors is placed more or less evenly along an inner circumference of the stator core 120 facing the airgap 103. Again, as described above, multiple stator conductors may be made into a coil, and multiple coils may be connected into a subphase winding, and multiple subphase windings belonging to the same phase may be connected together to form a phase winding. The relationship of coils, subphase windings and phase windings are the same to all embodiments in this disclosure, and will not be repeated later. Depending on the construction of the motor, a phase winding (also referred to simply as a winding) may be located in the rotor also, although the following discussion will generally use such windings in the stator as examples. Please note that the slots are optional, i.e. the stator core may have a slotless construction. When there are indeed slots in the stator core (similarly in a rotor core), the stator core is divided into tooth area 105 and yoke area 106.

Each coil in FIG. 2 may have a positive segment and a negative segment, which are usually wounded along the circumference along the airgap 103. Also, toroidal coils are sometimes used (a toroidal coil is wound across the yoke area adjacent to the slots housing the coil). A shortcoming of these conventional coils is that the inactive portion of a coil is relatively long compared to the active portion. A dual rotor topology with toroidal coils may reduce the length of the inactive portion of a coil. However, such topology still suffers in two aspects: the coils have high cost, and the power loss of the motor is still relatively high because these toroidal coils form concentrated windings which causes high spatial harmonics in the airgap MMF (Magnetomotive Force) or flux.

Figure 3:
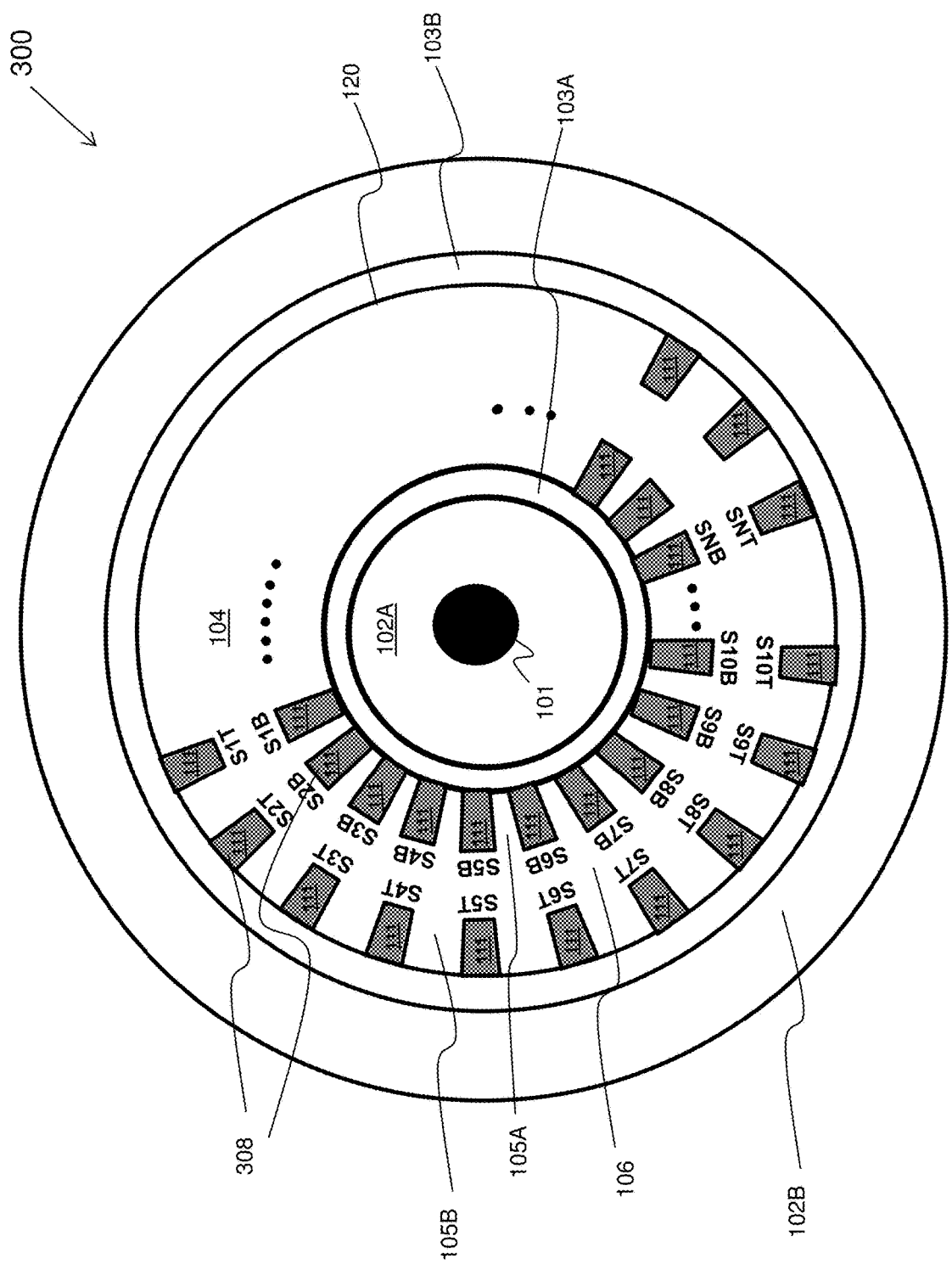
FIG. 3 illustrates a cross section view of a motor in accordance with various embodiments of the present disclosure.

FIG. 3 illustrates a simplified view of a high efficiency high density motor 300 with single stator and dual rotors in accordance with various embodiments of the present disclosure. The motor 300 has a cylinder-shaped stator 100 and two cylinder-shaped rotors 102A and 102B with two airgaps 103A and 103B between them. The stator 100 mainly comprises a stator core 120 and a plurality of windings 308 embedded into it. Looking from the cross section in FIG. 3, the stator core 120 has 2 surfaces, the inner surface facing airgap 103A and the outer surface facing airgap 103B. Two rotors 102A and 102B are both magnetically coupled to the stator, and the relative magnetic field strength through the magnetic coupling can be adjusted by the lengths of the two airgaps. FIG. 3 shows the cross section view of the motor cut through the stator core 120. The motor 300 comprises a first rotor 102A, a second rotor 102B, the stator core 120 and a plurality of stator windings 308 formed in the stator core 120. A stator winding 308 consists of a plurality of stator conductors 111, located inside multiple slots. The first airgap 103A with a length of g1 and the second airgap 103B with a length of g2 are shown as radial arrangements, but the disclosed technology also applies to motors and generators with axial airgaps (axial flux machines). The length of an airgap refers to the distance between the respective rotor and the stator core, i.e. g1 is the distance between 102A and 120, and g2 the distance between 102B and 120 in FIG. 3. A plurality of first slots (inner slots) designated S1B-S10B, etc. is formed in the stator core 120 along a perimeter and facing the first airgap 103A. Similarly, a plurality of second slots (outer slots) designated S1T-S10T, etc. is formed in the stator core 120 along a perimeter facing the second airgap 103B. The first slots may have a different shape or different size from the second slots, and the shapes of the slots may be used to help magnetic flux flowing around the slots more smoothly and more evenly. Each slot (e.g., slot S1B) is employed to accommodate a portion of a stator winding comprising one or more conductors (e.g., stator conductor 111). It should be noted that, depending on different designs, more than one stator windings may be embedded in one slot (i.e. the conductors in a slot may belong to different stator windings), and a winding in a slot may have single or multiple stator conductors. The conductors in a winding may be divided into a plurality of coils, and a coil generally comprises conductors in one of the first slots and a nearby second slot, preferably in a slot pair with two directly opposite slots such as S1B and S1T, or S2B and S2B to reduce the length of the end windings. Alternatively, the two slots in a pair such as S1B and S2B may not be directly opposite to each other, and may have an angular offset between them circumferentially. Please also note that in this disclosure, windings and state windings, conductors and state conductors are used interchangeably. Also, the terms of windings and coils are sometimes used interchangeably, as they both refer to a configuration of conductors to produce a voltage, power or torque in a motor.

The tooth areas in FIG. 3 are divided into first tooth areas 105A which are coupled to first airgap 103A and second tooth areas 105B which are coupled to second airgap 103B. In essence, the motor can be viewed as two submotors in parallel: the first submotor formed by the first tooth areas 105A, the first slots (and conductors in them) S1B, S2B . . . , the first airgap 103A and the first rotor 102A, and the second submotor comprising the second tooth areas 105B, the second slots (and conductors in them) S1T, S2T . . . , the second airgap 103B and the second rotor 102B. The first submotor and the second submotor have a common yoke. If the first rotor and the second rotor are not mechanically coupled together, they can have different characteristics as they can have different outputs. If the first rotor is mechanically coupled to the second rotor, their mechanical speeds are synchronized and thus care has to be taken to make sure that their torque outputs are in the same direction in an operation mode so they can add up. With proper arrangements, the currents of the conductors in the first slots and in the second slots may be configured such that the magnetic fields in the first airgap 103A and the second airgap 103B have the same angular speed and direction. In this way, the first submotor and the second submotor can generate torques in the same direction in an operation mode. The two submotors can be configured to have similar electro-magnetic characteristics, for example they may have approximately the same (e.g. within 20% difference) key parameters of speed-torque curves, but may produce different amount of torque in an operation mode. For example, the outer rotor has more airgap area, and thus may be designed to produce higher torque than the inner rotor. The airgap length g1 and g2 can be designed to have different values according to system needs, and such values can be configured to adjust the relative strength of magnetic flux in, and thus the relative power and torque split between, the first submotor and the second submotor (i.e. between the first rotor and the second rotor). There are many ways to achieve this. For example, the currents of conductors in the first slots can be arranged to have the same amplitude, frequency and angles as the currents of conductors in the corresponding second slots. If the conductors in first slots and second slots form different windings, this can be achieved through proper control of winding currents. If each coil of stator windings is wound or formed with one edge (conductor) embedded in a first slot and another edge (conductor) embedded in a second slot, this can be achieved naturally. In this case, the stator coils are arranged radially, and form radial windings. The following discussion will use this radial winding configuration as examples. Also, the rotors mechanically coupled together should be configured to have similar electro-magnetic characteristics (for example, reaching their respective maximum torques at approximately the same slip frequency if induction rotors are used, or have approximately the same ratios of d-axis inductance over q-axis inductance if synchronous rotors are used), so one set of control for the stator winding currents will achieve good performance in all submotors, and in all operation modes the output torques of all rotors should be in synchronization or additive with an almost constant ratio, to make electric, magnetic, mechanical and thermal stresses on all rotors similar. For example, if induction rotors are used, then the inductance and resistance in all rotors should be designed to make all rotors to have the same or approximately the same max-torque slip for given operation modes. If the torque in each rotor has significant ripple such as in switching reluctance machines, synchronous reluctance machines and IPM machines, the rotors may have similar shape, but main features related to reluctance, such as position of poles or teeth, are shifted with certain mechanical angles, so the pulsating torque components in different rotors may be smoothed out to reduce the ripple in the total output torque. Similarly, the first slots and second slots (teeth between them) may have an angular shift (i.e. have an angle offset along the circumference) so the tooth-slot effect on the stator currents and the output torque in the two submotors may have a proper phase shift so the combined effect can be significantly reduced.

It should be recognized that while FIG. 3 illustrates the motor system 300 with few slots and stator windings, the motor system 300 could accommodate any number of slots and stator windings. The slots are generally evenly distributed along a perimeter of the motor, and are labeled consecutively. Throughout the description in the present disclosure, a slot and the coil(s) in it have the same designation. For example, S5B refers to the 5th first slot, S5T refers the 5th second slot, and S5 may refer to a coil embedded in the slot pair S5B and S5T. When there are multiple coils in a slot pair, a numerical suffix may be added to the coil number with a dash sign between. For example, S1-2 means the second coil in the slot pair S1B and S1T. Please note that slots and teeth here are more relevant to the relative locations of the conductors and coils associated with them, and teeth or slots themselves are optional. Innovations in this disclosure may also be applied to motors and generators in slotless constructions.

The two rotors 102A and 102B may each have a mechanical output port and produce a mechanical output torque. A shaft 101 is shown in the center of the first rotor 102A which can be used to couple the mechanical torque of the first rotor to an output port of the motor or as an output port of the motor. Similarly, the second rotor 102B may be coupled to a mechanical output port of the motor, for example a wheel, a propeller, a gear or other mechanical device which can transfer mechanical power and torque. Please note that in a multi-rotor configuration presented throughout this disclosure, the mechanical output ports of multiple rotors such as 102A and 102B may be separate, or may be combined or coupled together into one output port. In case the outputs of multiple rotors are combined into one output port, these rotors have to be either all asynchronous (induction) type, or all synchronous type. Uncoupled rotors may have different types. Various rotor topologies can be used. Examples of synchronous types include various PM rotors, switching or synchronous reluctance rotors, wound synchronous rotors, etc. Examples of asynchronous types include various induction rotors, both squirrel-caged and wound. The innovation in this disclosure can be applied to all rotor types or stator types, so this disclosure will focus on only the innovative aspects of the motor and motor systems, and other details are omitted for the sake of conciseness. If needed, a mechanical housing may be put outside the second rotor 102B for protection, cooling and mechanical support, but each technology discussed in this disclosure also works without external mechanical housing, which can be used in drones, aircrafts, vehicles, and boats to directly propel the load, such as in in-wheel drive systems for EVs.

Figure 4:
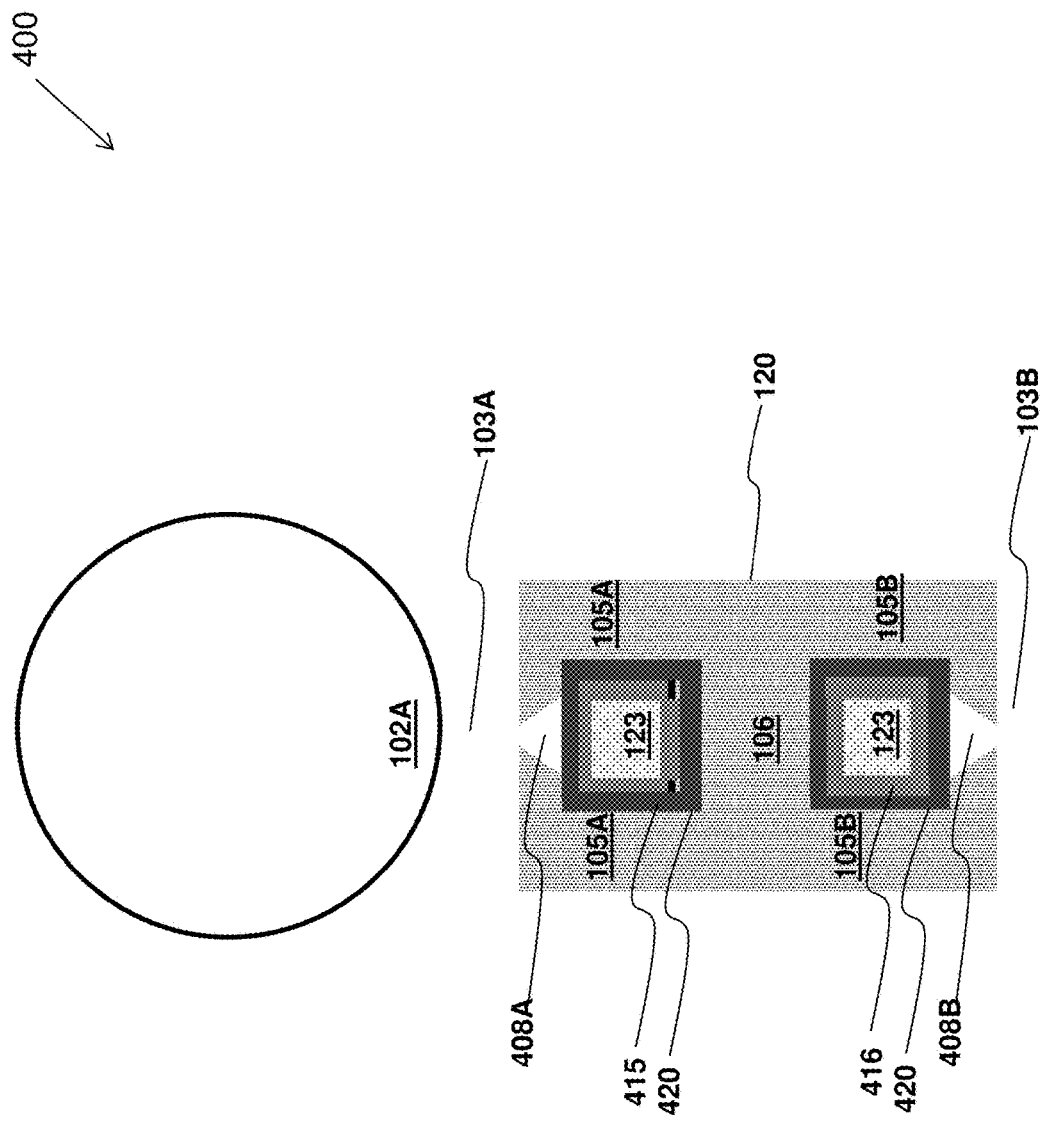
FIG. 4 illustrates a simplified view of a coil in accordance with various embodiments of the present disclosure.

FIG. 4 further illustrates details of a coil in a pair of slots in accordance with various embodiments of the present disclosure. FIG. 4 is a simplified enlarged view of an area around a stator slot pair in FIG. 2. A region 106 is a portion of the stator core called a yoke. In a cylinder stator, the yoke area 106 forms a circular strip. In the figure two slots, first slot 415 and second slot 416, are shown, and they form a slot pair. A first tooth area 105A and a second tooth area 105B are formed on the two sides of the yoke strip 106 by cutting out the slot pair 415 and 416 on the stator core 120. The yoke 106 and the teeth 105A, 105B form the core 120 of the stator. The core is made of a magnetic material such as a silicon steel laminate, a ferrite, an iron powder or a magnetic compound through a process such as punching, cutting, milling, casting, molding, printing, plating, pressing, baking, depositing etc. A first slot 415 is formed between the yoke region 106 and first airgap 103A Similarly, a second slot 416 is formed between the toke region 106 and second airgap 103B. The walls of a slot may have an insulation layer 420 to withstand a relatively high voltage. A slot may be closed, or may have an opening 408. The opening 408 reduces the leakage inductance of the winding/windings embedded in the slot. The opening 408 may be empty, or filled a with mechanical support material, which may or may not be a magnetic-conducting or electric-conducting material. In some embodiments, suitable materials such as solder paste may be put into the slot or opening 408. After a reflowing or other soldering process, the solder paste forms a cap to further secure the position of the conductors in the slot.

Stator conductors (111 in FIG. 3) can be put into slots 415 and 416, and stator conductors in an inner slot (first slot) and a nearby outer slot (second slot) can form a (or multiple if needed) coil 123. That is, the coil 123 (and thus the winding it is a part of) is arranged radially, and can be called a radial coil/winding. The stator coil 123 can have a single turn or multi turns, and may be placed in one or more layers in the slots. There may be an insulation layer 420 between the different conductors, between different layers, or between a conductor and the core of the stator if the conductor needs to withstand a relatively high voltage.

As shown in FIG. 4, the stator 100 and the rotor 102A are separated by the airgap 103A. For brevity, only one stator coil 123 in each slot has been illustrated in FIG. 4. A person skilled in the art would understand a slot may accommodate a plurality of stator coils. The plurality of stator coils may be electrically connected to each other. In the manufacturing process, a stator conductor may be inserted into a slot of a motor as a component. Alternatively, stator conductor may be manufactured into the slot through suitable processes such as molding, casting, plating or printing processes using a conductive material, separately (consequentially) or together with other stator conductors (simultaneously). A stator coil may be wound with suitable magnetic wires, or formed by mechanically connecting stator conductors in different slots, or pre-formed into an appropriate shape through bending, punching, stamping, cutting, etching, casting, molding, printing or other suitable process.

Figure 5:
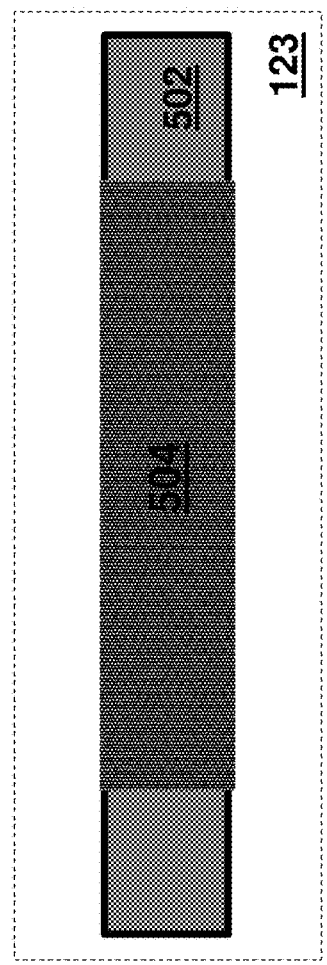
FIG. 5 illustrates a simplified view of a conductor of a motor in accordance with various embodiments of the present disclosure.
Figure 5:
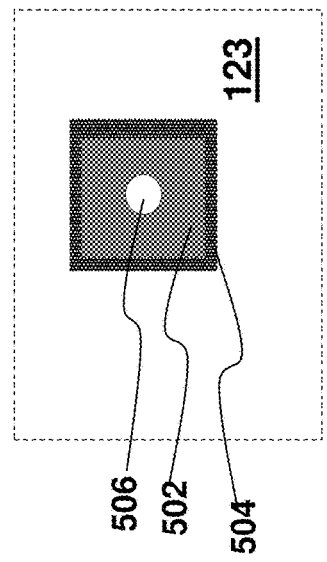

FIG. 5 illustrates a simplified view of a stator conductor/coil 123 in accordance with various embodiments of the present disclosure. The stator coil 123 comprises a metal bar 502, and optionally an insulation layer 504 may be over portion of the metal bar 502. The metal bar 502 may be formed of any suitable conductive materials such as aluminum, steel, copper, any combinations thereof and the like. Although a rectangular cross section is shown, it can be of any shape which can fit the cross section of the slot. Also, a straight bar was shown, but it may be shaped in any suitable form or shape to fit the slots it will be embedded into. Cooling apparatus, such as cooling channels, thermal pipes or cooling fans, may be attached to a stator coil. As an example, in FIG. 5 the round shape 506 inside the winding illustrates a cooling feature, which can be a thermal pipe, a hole to be filled with cooling liquid, or a pipe filled with cooling liquid etc. Of course, cooling features may be applied to the stator or rotor core if needed.

There may be a variety of processes to form the insulation layer 504 with a suitable insulation material. In some embodiments, in order to increase the voltage-standing ability of the stator coil 123, part of the stator coil 123 located inside the stator core may be coated or covered with suitable insulation materials such as insulation paper, film, epoxy or paint. In some embodiments, an oxidation process is applied to the metal bar and an oxidized layer is formed. The oxidized layer with appropriate thickness is an insulation layer. During the oxidation process, the areas to be used for the electrical connection may not be oxidized. Through suitable oxidation processes, around the surface of the metal bar a suitable oxidized layer can be formed to stand a voltage high enough for the intended application.

The insulation layer may also provide a good thermal conduction path so that heat can be transferred between the stator windings and the magnetic material adjacent to the stator windings. It should be noted that, depending on different applications and design needs, the conductors of a winding in a slot can be casted, molded, or otherwise fabricated as a single piece. Or all the conductors of windings in a motor can be fabricated at the same time, for example casted into slots of the stator core simultaneously.

Figure 6:
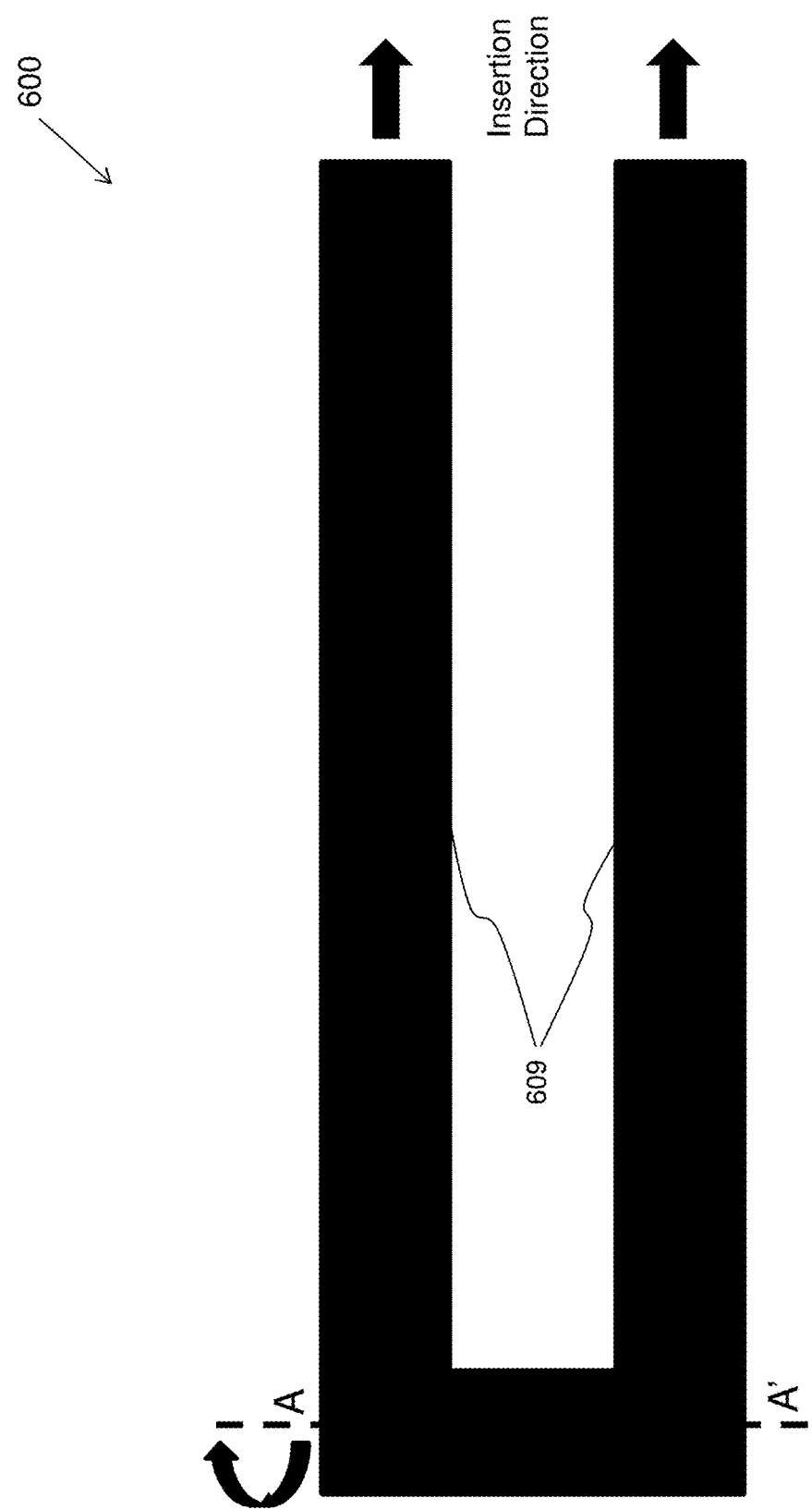
FIG. 6 illustrates a simplified view of a coil structure in accordance with various embodiments of the present disclosure.

FIG. 6 illustrates a simplified view of a single turn coil structure in accordance with various embodiments of the present disclosure. The two long edges 609 of the structure are meant to be placed inside a first slot and a second slot. The end portion (the A-A' edge) of the structure may be bended over along the line A-A' to reduce the required space. The bended portion may be mechanically attached to the main body of the coil to allow better current conduction. The shape of the coil as well as the shape of its cross section can be designed properly for performance, cost or any other purpose. An advantage of the open-end shape in FIG. 6 is that the coil can be inserted into the core easily in the direction shown to reduce the manufacturing complexity and cost. The shape of the ends of the coil may be smoothed to allow better insertion into the slots. The structure in FIG. 6 may be pre-formed altogether to save manufacturing cost. As an alternative, the end portion of the coil may be a separate part, and attached to the long edges through various soldering, bonding or welding techniques. Multiple coil structures may be connected in series or in parallel in a motor to form multi-turn coils/windings or conduct higher currents.

Figure 7:
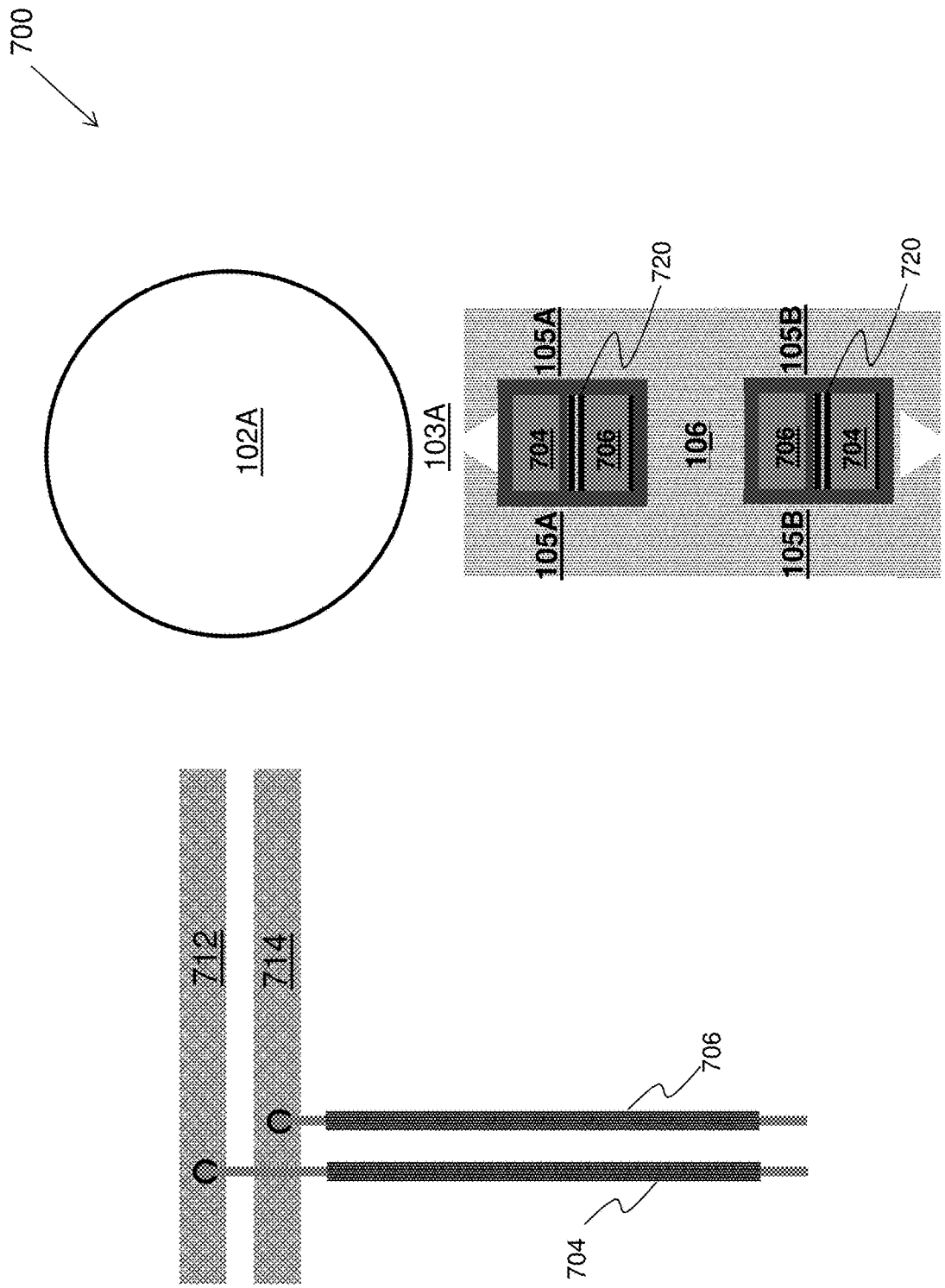
FIG. 7 illustrates an arrangement of multiple windings in a pair of slots in a motor in accordance with various embodiments of the present disclosure.

Multiple stator coils may be placed in a slot pair. FIG. 7 illustrates a cross sectional view of an area adjacent to a slot pair in which two stator coils 704 and 706 are located. One of the coils is placed on top of the other in accordance with various embodiments of the present disclosure. The multiple coils in a slot may belong to the same phase of the motor, or may belong to different phases of the motor. There may be an insulation layer 720 between them to withstand a high voltage if needed. FIG. 7 shows the two stator coils 704 and 706 are connected to different electrical nets, and thus may belong to different phases. The stator coils 704 and 706 may have the same or different construction, for example have different number of turns or different cross areas.

Figure 8:
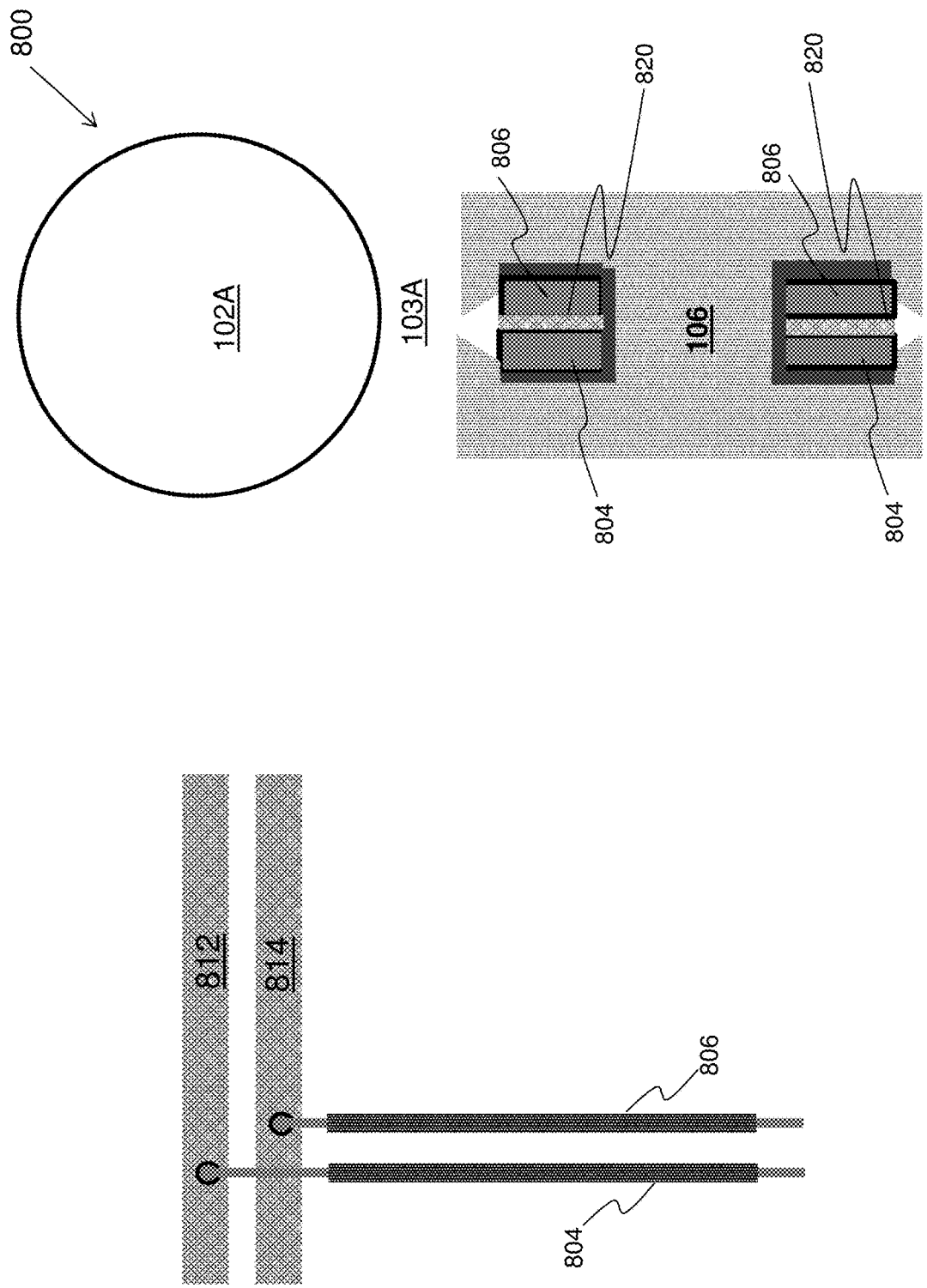
FIG. 8 illustrates another arrangement of multiple windings in a pair of slots in accordance with various embodiments of the present disclosure.

FIG. 8 shows an implementation similar to FIG. 7, but the stator coils 804 and 806 in the slot pair are arranged horizontally.

Figure 9:
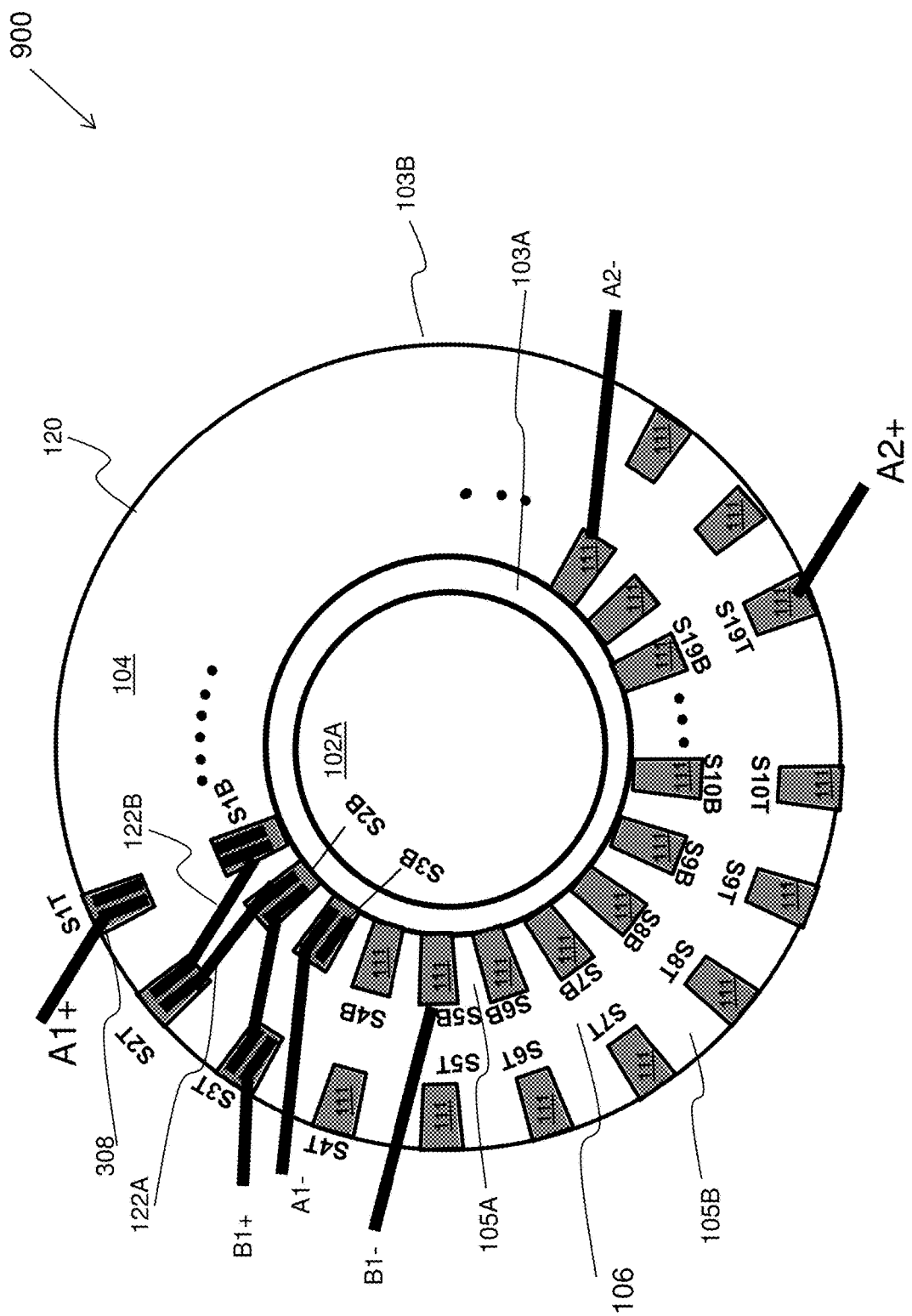
FIG. 9 illustrates a perspective view of stator winding connection of a motor in accordance with various embodiments of the present disclosure.

FIG. 9 shows a view of one end of the motor shown in FIG. 3 illustrating the interconnection of coils and/or windings. As an example, each slot contains 2 horizontally arranged coils. When needed, an in-slot connection connect 122A may connect coils in the same slot pair, in series or in parallel, with series connection shown as an example. When needed, an inter-slot connection 122B can connect coils in different slot pairs, in series or in parallel, with series connection shown as an example. In this drawing, two coils (or windings) were shown in each slot pair. S1 and S3 have windings (i.e. coils) belong to Phase A and another phase, and thus can be called partial-phase slots (i.e. windings or coils belonging to a phase winding just occupies part of the slot). The windings/coils in S2 all belongs to Phase A, thus are called a full-phase slot (i.e. windings or coils belonging to a phase winding occupies the whole slot). The coils (or windings) located in S1 through S3 and belonging to Phase A are connected in series here to form a subphase winding A1 (with leads shown as A1+ and A1−). There may be multiple full slots and multiple partial slots in a subphase winding. In an ideal situation, the subphase windings belonging to all phases in the motor spread around stator 100, usually evenly and symmetrically. A proper arrangement of partial slots between different subphase windings may create smooth transition of MMF in an airgap along the airgap perimeter, and allow the magnetic field in the airgaps (103A and 103B in this case) to have a more smooth and better sinusoidal distribution spatially, thus reducing power losses, vibration, and noise in the motor. Considering the stator windings have very short end portion, the space utilization of the motor is further improved, and thus resulting in a high-performance, high efficiency, high power/torque density motor.

The subphase windings belonging to the same phase can be connected in a good way to further enhance the performance of the motor. One particular consideration for choice of connection type is to overcome the effects of uneven airgap length along the perimeters of the rotors, which may be caused by mechanical vibration or defection in design or manufacturing, such as bending or other form of deformation of the rotor or the stator. In FIG. 9, another subphase winding A2 (with leads of A2+ and A2−) of Phase A which is about 180° apart mechanically from the subphase winding A1 is illustrated. As subphase windings A1 and A2 are mechanically 180° apart, some mechanical defects will have opposite effects. Therefore, the connection of A1 and A2 should be arranged to balance such effects in the overall performance of the motor, especially forming a smooth and roughly even magnetic field in the airgaps. For example, if the torque-generating magnetic field is generated mostly by permanent magnets (such as in various PM machines), A1 and A2 should be put in series to force the currents in them to be equal. If the torque-generating magnetic field is generated mostly by winding currents such as in induction machines or switching reluctance machines, it is better to connect A1 and A2 in parallel so the magnetic field strength in the airgap around A1 and A2 will be similar. Also, if the number of pole pairs of the motor is odd, the current in A1 and A2 will have opposite polarity, and the A1 and A2 should have reverse connection, for example A1+ should be connected or coupled to A2−, or A1− should be connected or coupled to A2−. In case all subphase windings are treated as phase windings (i.e. each phase has only 1 subphase winding), the control of the windings 180° apart mechanically can be configured according to how the magnetic field is generated, to cause the winding voltages or the winding currents to be approximately the same in order to develop a smooth magnetic field distribution in the airgaps.

Figure 10:
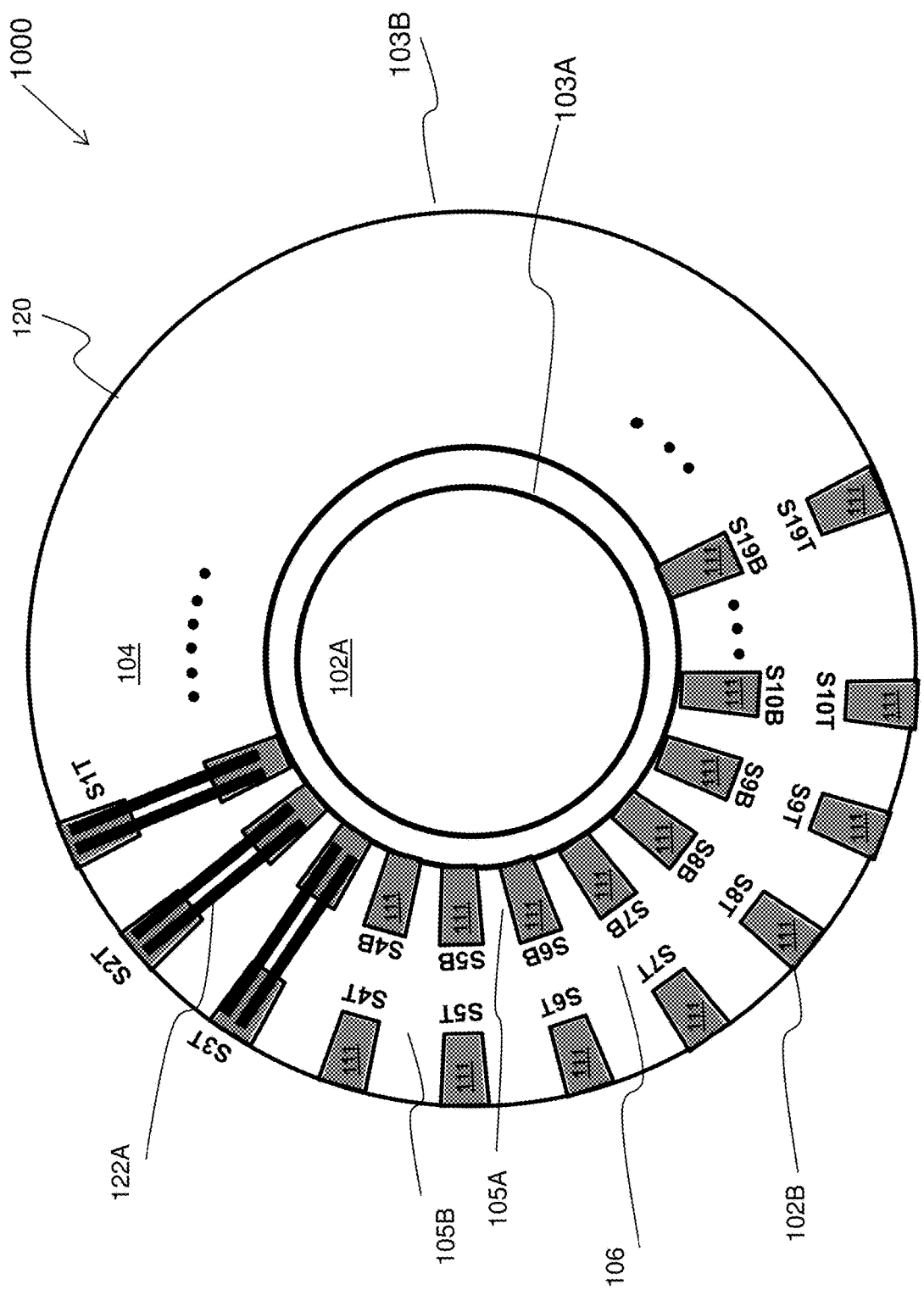
FIG. 10 illustrates another perspective view of stator winding connection of a motor in accordance with various embodiments of the present disclosure.

FIG. 10 illustrates a simplified view of the other end of stator 100. The in-slot connection 122A shown in the figure may be the end portion of windings, for example the portion along the line A-A' in FIG. 6.

FIG. 11 shows an exemplary winding (coil) arrangement of a 36-slot motor in accordance with various embodiments of the present disclosure. Designators S1, S2 etc. represent slot pairs. For example, S1 represents both S1B and S1T. As an example, there are two coils in each slot (or each slot pair), which may belong to the same phase or different phases. FIG. 11 shows nine phases labeled from A through I, with Section 2 repeating assignments of phases (i.e. the association of slots to phases) same as or similar to Section 1. In actual design, number of phases can be changed according to design objectives. It is also feasible to have different phase-slot assignment in Section 1 and Section 2 so the motor may have 18 phases with a similar arrangement. Higher number of phases may be desirable when the motor has high power rating. Also, the arrangement of the coils and slots can be repeated to have more slots and/or phases. In each subphase winding, there is a full-phase slot (for example, S2 for Phase A), and 2 partial-phase slots (for example, S1 and S3 for Phase A). In this way, a phase winding may start with a partial slot both directions along the perimeter in space. One advantageous feature of having such an arrangement is the space harmonics in the airgaps may be reduced because each winding starts and ends with a partial slot in space and the spatial distribution of the magnetic field in the airgaps is relatively smooth. It is also feasible to have more or less full slots or partial slots in each subphase winding. When more than one partial slot is used between full slots assigned to adjacent phases, the number of turns of the coil/winding belonging to a phase may decrease or increase linearly or sinusoidally in these partial slots, to make the flux distribution in the airgaps smoother without reduced spatial harmonics. Of course, it is also possible that a subphase winding starts with a full slot in one or both direction if needed.

Figure 12:
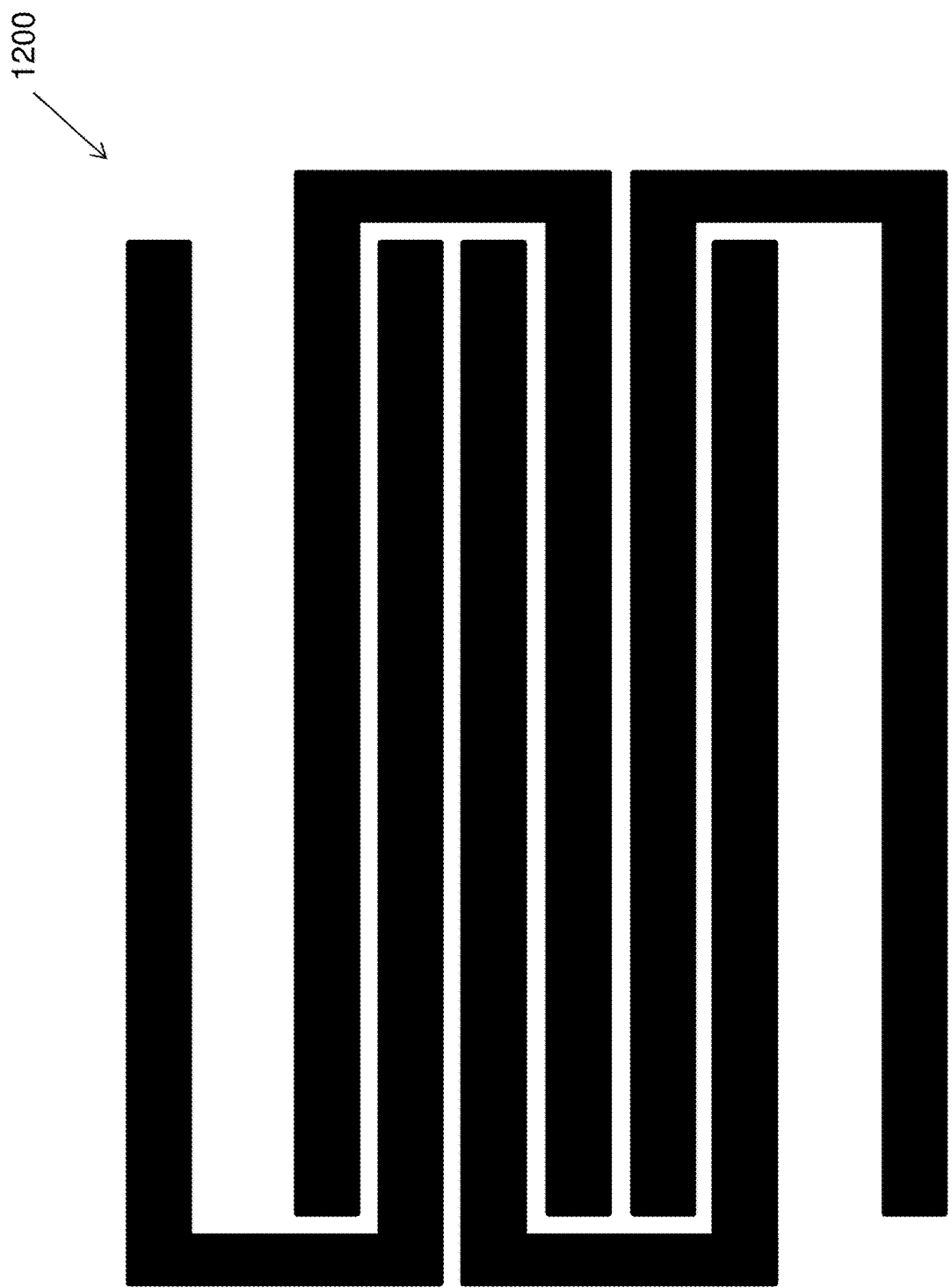
FIG. 12 illustrates a perspective view of arranging multiple coil structures into a pattern in accordance with various embodiments of the present disclosure.

It should be noted that depending on different applications and design needs, the winding arrangement may vary accordingly. A coil can be wound or pre-formed as discussed before. When pre-formed coils are used, it is advantageous to align multiple coils into a suitable pattern and manufacture them together to reduce manufacturing cost and maintain good manufacturing consistency. FIG. 12 shows an example pattern based on the coil shape in FIG. 6. Different shapes of coils or different patterns can be used. One or more patterns may be manufactured in batch with punching, stamping, cutting, casting, molding, etching, plating, printing or other suitable process.

Figure 13:
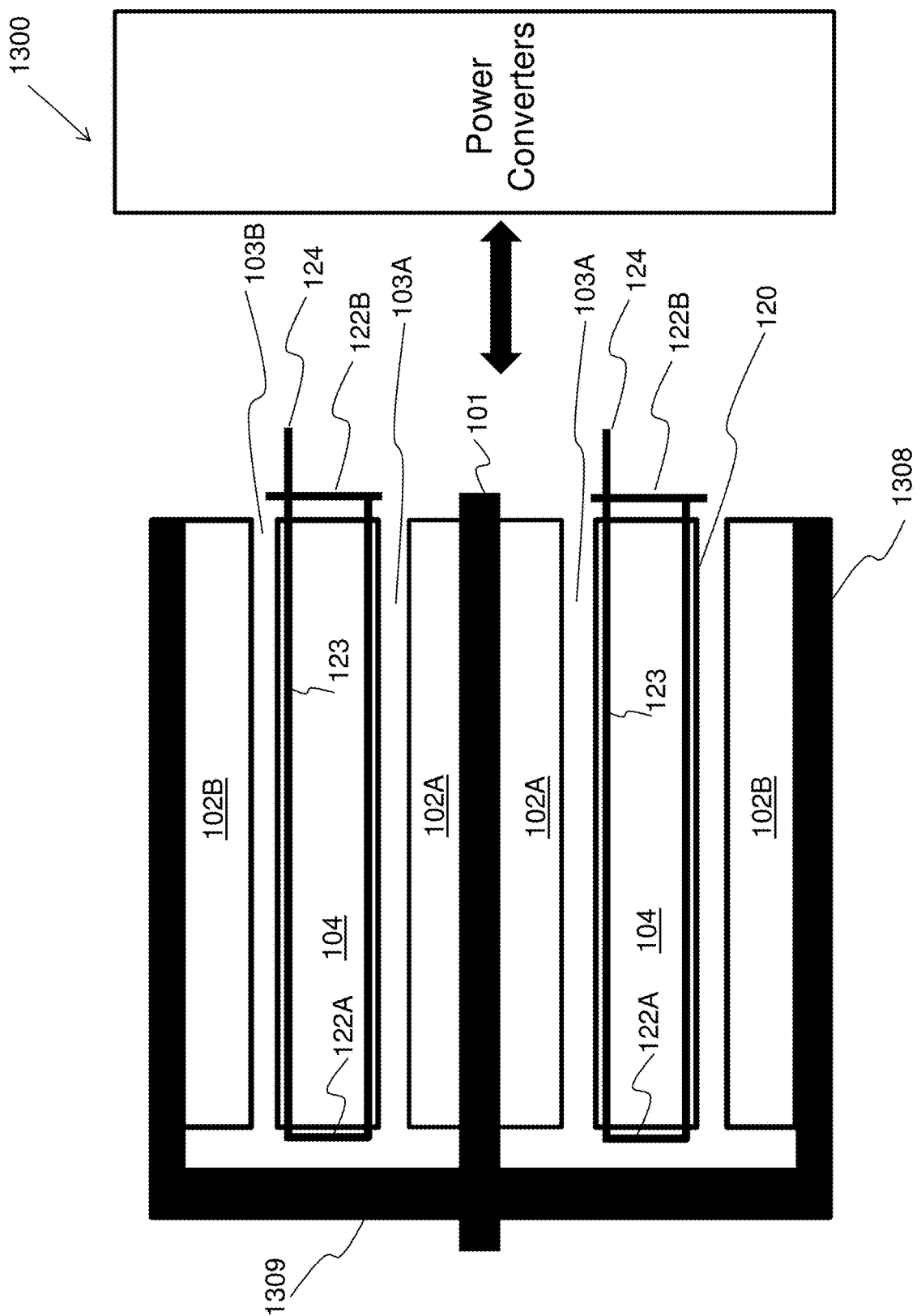
FIG. 13 illustrates a motor drive system in accordance with various embodiments of the present disclosure.

FIG. 13 shows an illustration of a simplified cross section view of a motor cut in longitude orientation in accordance with various embodiments of the present disclosure. Here suitable power converters, such as inverters or dc-dc converters are coupled to the power leads 124 at one end of the stator 100, and at the other end a mechanical coupling device 1309 couples the mechanical torque on mechanical support 1308 (generated by the second rotor 102B) to the mechanical shaft 101, which is the mechanical output port of the first rotor 102A. The mechanical coupling 1309 may be a direct mechanical connection as is shown, or suitable mechanical devices such as gears. In this way, the mechanical outputs of multiple rotors can be combined together. The mechanical coupling device 1309 is optional, and the first rotor 102A and second rotor 102B may have separate output ports. The power converters may be integrated inside the same housing/body of the motor, or be located in a separate housing. Suitable control is utilized to achieve good performance of the system. Particularly, advanced technique, such as dynamically reconfigurable control with its winding arrangement (DR Technology), disclosed in U.S. Pat. Nos. 9,240,748, 9,490,740, 9,800,193 etc. and US patent applications 20190058364, 20190058430, 20200204099 etc., can be used to further improve the system performance, because with the DR technology, the yoke of the stator and the length of the end windings with the winding arrangement in this disclosure, can be significantly reduced, leading to greatly reduced size, weight and cost of the motor, it is of particular interest to use it in combination with the technology discussed above.

Figure 14:
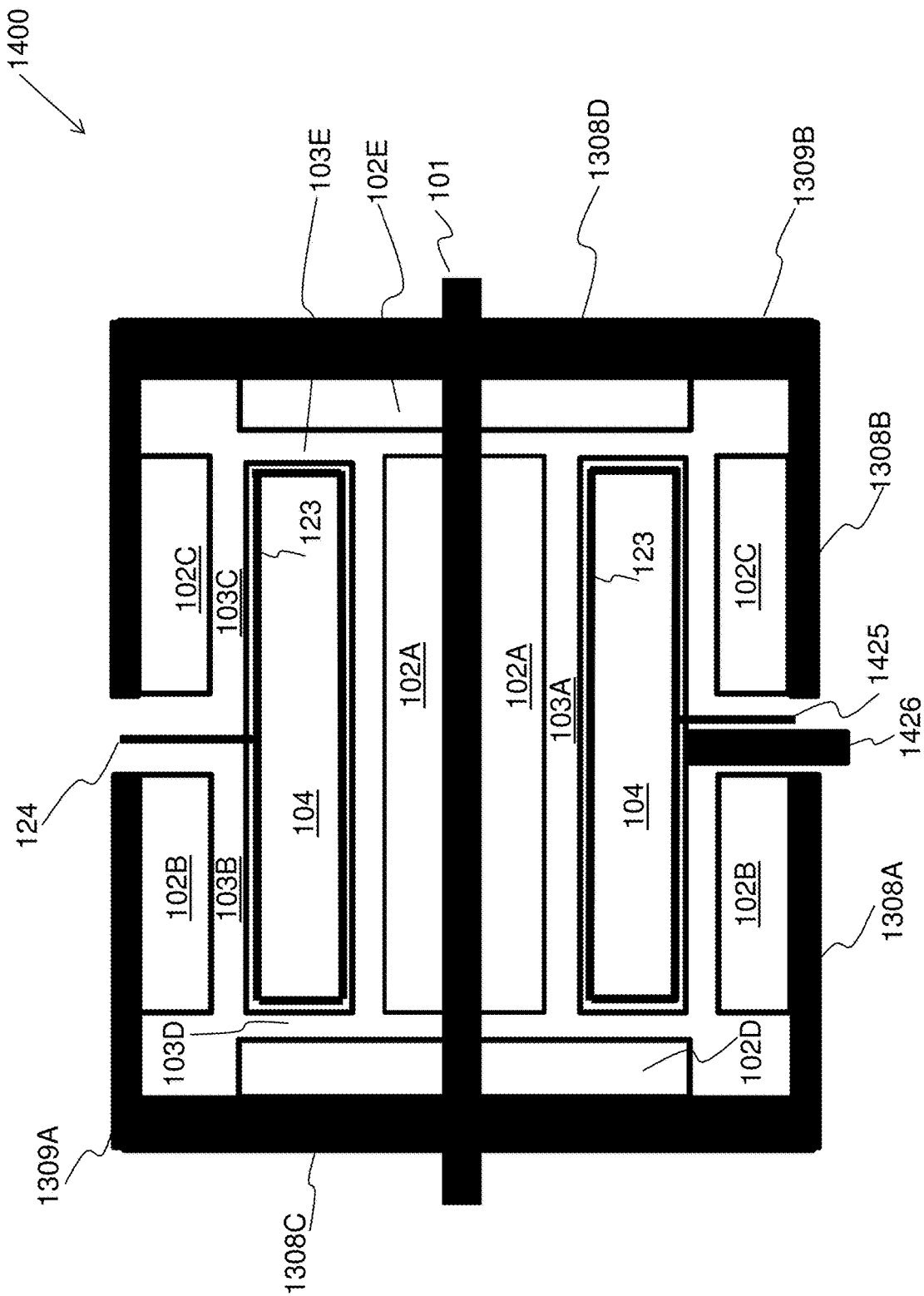
FIG. 14 illustrates a configuration of a motor with two sections in accordance with various embodiments of the present disclosure.

The configuration in FIG. 13 can be used as a building block to expand the motor along the shaft or radially. FIG. 14 shows an exemplary implementation of expansion in axial direction in accordance with various embodiments of the present disclosure. FIG. 14 shows that two motors with similar configuration as the one shown in FIG. 13 are combined or integrated into one. Please note that the stators and first rotors of both configurations are combined into 1 set, i.e. inner rotor 102A and stator 100. The stator winding 123 may extend through the whole stator. Alternative, the stators or first rotors of the two configurations may be kept separated if wanted. The second rotors 102B and 102C are shown as separate, with airgaps 103B and 103C separating them from the stator 100. The power leads 124 are now located in the center region which is located between the two original configurations. The connection between stator windings and subphase windings 1425 can also be arranged in the center portion. Block 1226 represents additional features, such as cooling, mechanical support, sensing, and power converters. All of these, or some of these, can also be located in the center region.

To utilize fully the space inside the motor to generate more torque and power, one or two axial submotors may be incorporated at an end or both ends of a motor. In FIG. 14, axial rotors 102D and 102E are added. Of course, each of these axial rotors is optional, and should be added only when needed. They can produce more torque output to mechanical supports 1308C and 1308D. The stator windings corresponding to rotor 102D are actual the left-side end winding of stator windings 123, coupled through airgap 103D. The stator windings corresponding to rotor 102E are the right-side end winding of stator windings 123, coupled through airgap 103E. The end portion of stator 100's core may be an added magnetic structure similar to the stator core of an axial flux machine, which may have or may not have tooth. The pattern of the stator windings for the axial rotors 102D and 102E are same as the end windings shown in FIG. 10, and the rotors 102D and 102E can be configured and designed accordingly. The magnetic fields in airgaps 103D and 103E are configured to have the same synchronous speed and direction as the magnetic fields in airgap 103A, 103B, and 103C, and thus rotors 102D and 102E can contribute significant torque and power to the motor, when the motor diameter is significant compared to its length.

The outputs of some or all the rotors in FIG. 14 can be coupled through optional mechanical coupling devices 1309A and/or 1309B. These mechanically coupled rotors have to be all of synchronous type or asynchronous type. However, different synchronous topologies, such as switching reluctance, synchronous reluctance, IPM, SPM, and wound synchronous etc. can be mixed and used in combination. Similarly, different asynchronous topologies, such as squirrel-cage induction and wound induction, can be mixed and used in combination. The mixed use of different rotor technologies allows better customization of motor performance according to system needs.

Figure 15:
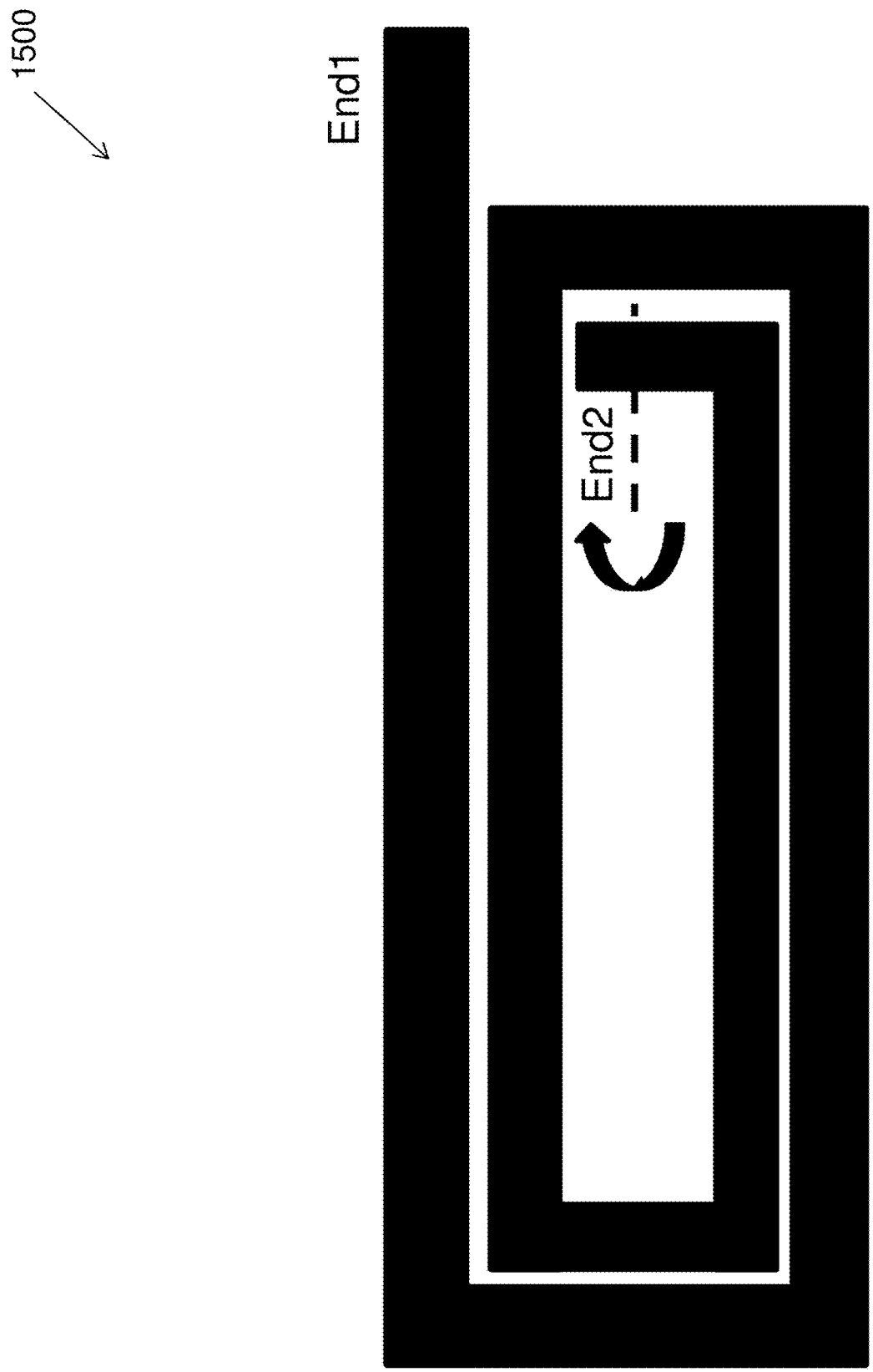
FIG. 15 illustrates a perspective view of a multi-turn coil in accordance with various embodiments of the present disclosure.
Figure 16:
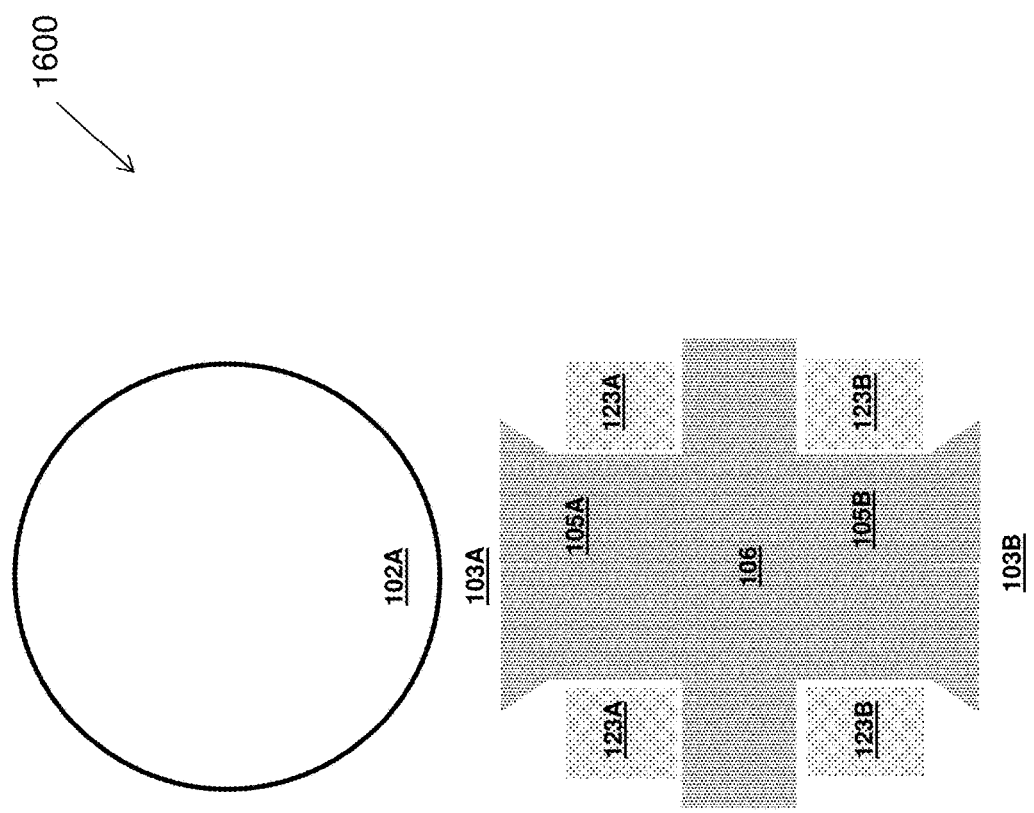
FIG. 16 illustrates a segment of a stator of a motor in accordance with various embodiments of the present disclosure.

To reduce the cost of windings, sometimes it is desirable to manufacture pre-formed coils with multiple turns. FIG. 15 shows an exemplary pre-formed stator coil with two turns in accordance with various embodiments of the present disclosure. This coil has two terminals End 1 and End 2. The two terminals can be used for interconnections, and can be shaped properly to make interconnection easier. For example, End 2 can be bent along the dotted line. To insert such a multi-turn pre-manufactured coil into the stator 100, the stator core can be divided into multiple segments, each being similar to the structure shown in FIG. 16, in which 105A and 105B are tooth area, while 106 is a yoke area. A coil consisting of 123A and 123B is located on each side of such a core segment.

Figure 17:
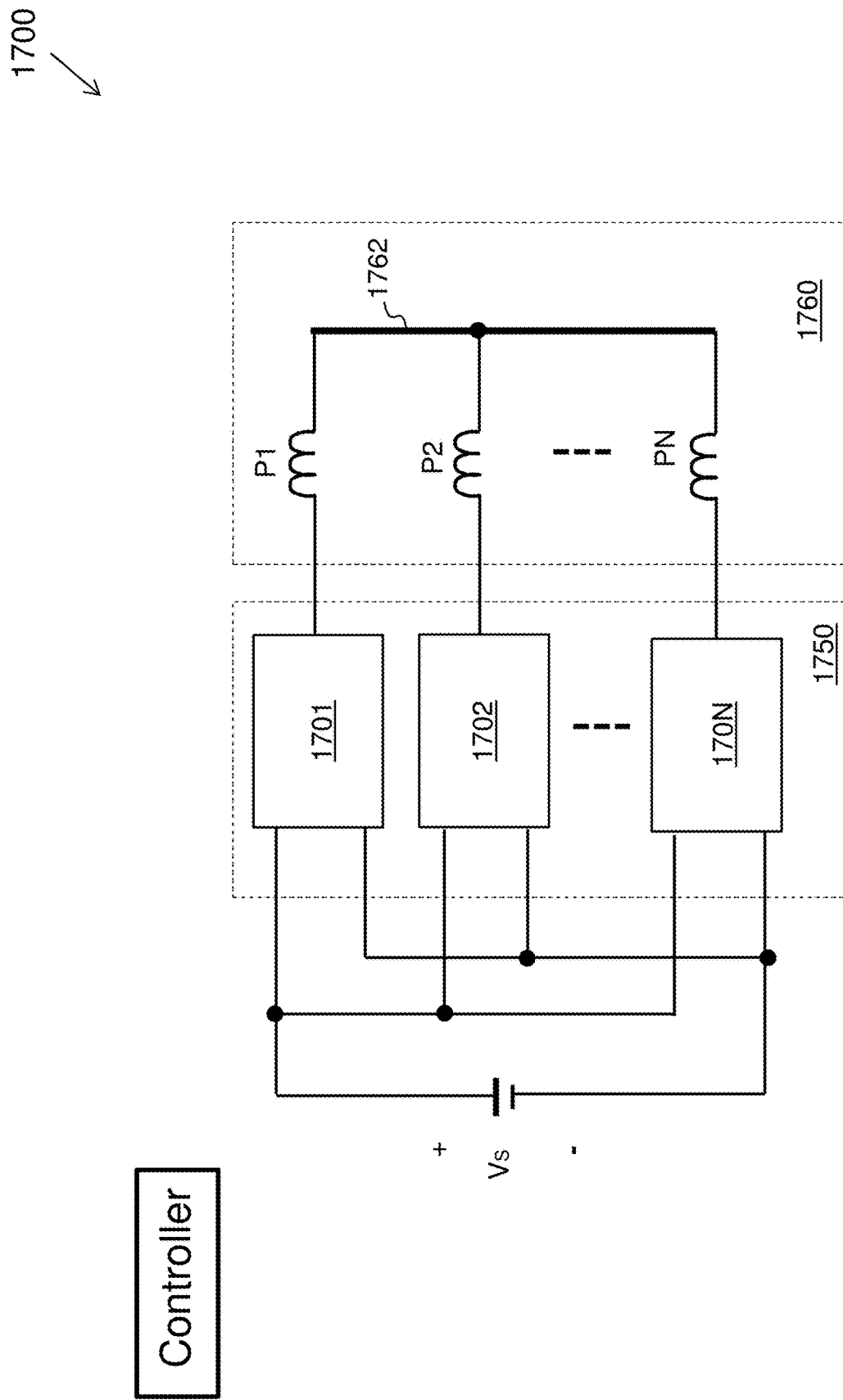
FIG. 17 illustrates a block diagram of a motor drive system in accordance with various embodiments of the present disclosure.

Appropriate power converters may be employed to control the motor. All the power converters can be connected to a single power source. FIG. 17 illustrates a block diagram of a motor system having N phases in accordance with various embodiments of the present disclosure. The motor system 1700 comprises N power converters, each coupled to a phase winding. All power converters 1701-170N are coupled to the input voltage (i.e. a power source) Vs. The power converters form a power converter group 1750. There are N phase windings in the motor 1760, denoted as phase P1, P2, . . . , PN. Each phase winding (e.g., winding P1) has two terminals, the first coupled to a power converter (e.g., power converter 1701), and the second terminals of all or some phase windings may be connected together to form a star connection. It should be noted that the connection of the second terminals of phase windings may form a connection bar or connection ring 1762. The power converter group 1750 may be controlled as a multi-phase converter or N single phase converters to regulate the currents of the phase windings. Various topologies can be used for the power converters. For example, usually the power converters in FIG. 17 utilize a half-bridge topology.

Figure 18:
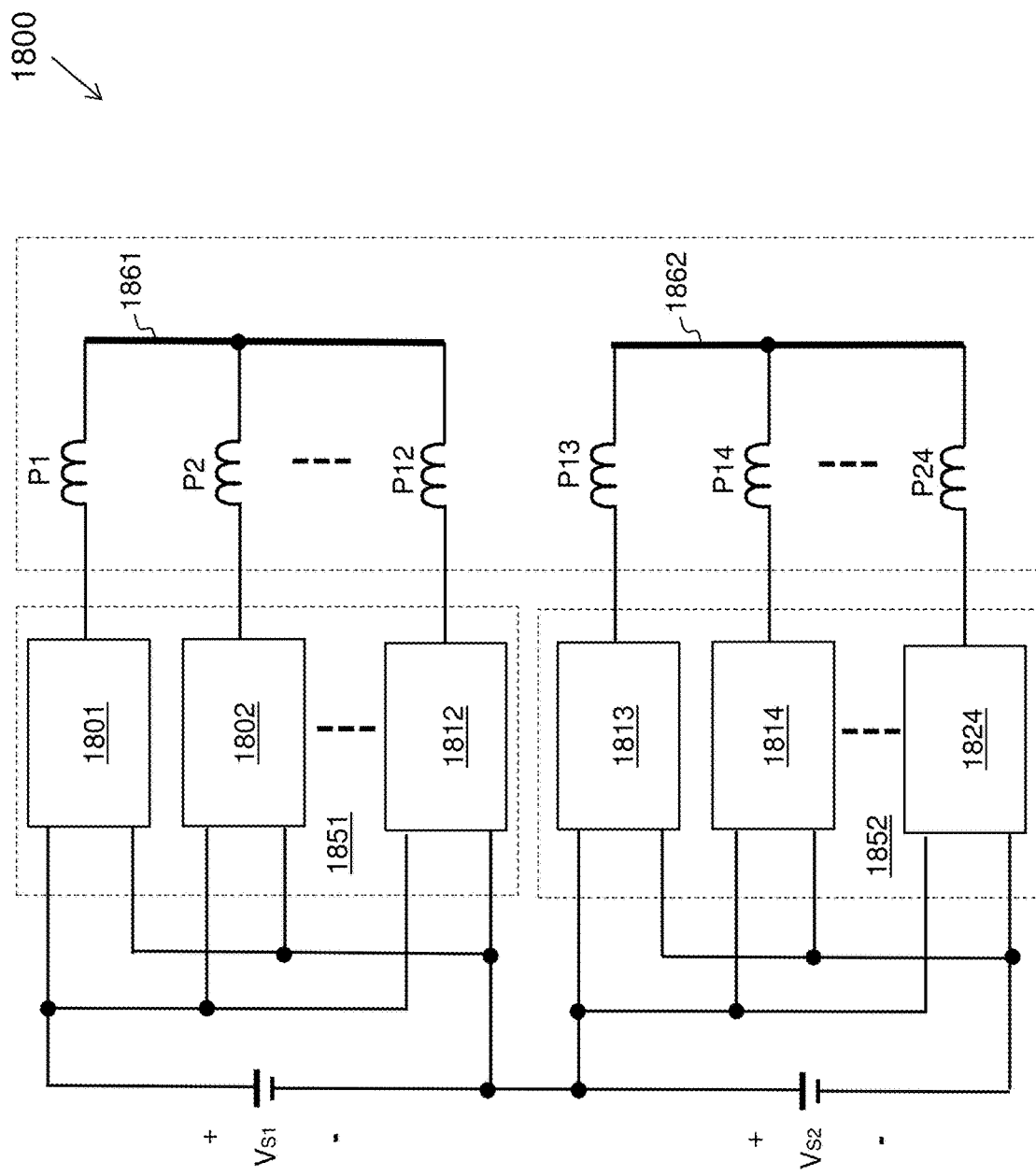
FIG. 18 illustrates another block diagram of a motor drive system in accordance with various embodiments of the present disclosure.

Sometimes it is advantageous to divide the phase windings into several symmetric groups sequentially or alternatively, and couple them through groups of power converters to a plurality of input voltage sources. These input voltage sources may be connected in series as is shown in FIG. 18, where two groups are shown with two input sources Vs1 and Vs2 connected in series. Of course, when needed different input sources may have no interconnection.

The first power converter group 1851 comprises 12 power converters 1801-1012. Each converter (e.g., power converter 1801) has an input coupled to the power source Vs1 and an output coupled to a corresponding phase winding (e.g. P1). As is shown in FIG. 18, a first end of each phase winding (e.g., P1) is coupled to the output of the corresponding power converter (e.g., power converter 1801). A second end of each phase winding is coupled to the connection bar or connection ring 1861.

Similarly, the second power converter group 1852 comprises 12 power converters 1813-1824. Each power converter (e.g., power converter 1813) has an input connected to the power source Vs2 and an output connected to a corresponding phase winding (e.g. P13). As is shown in FIG. 18, a first end of each phase winding (e.g., P13) is connected to the output of the corresponding power converter (e.g., power converter 1813). A second end of each phase winding is connected to the connection bar 1862.

The first power converter group 1851 and the second power converter group 1852 may be controlled to maintain a charging balance between Vs1 and Vs2, as they usually implemented as capacitors instead of independent power sources in actual designs.

Figure 19:
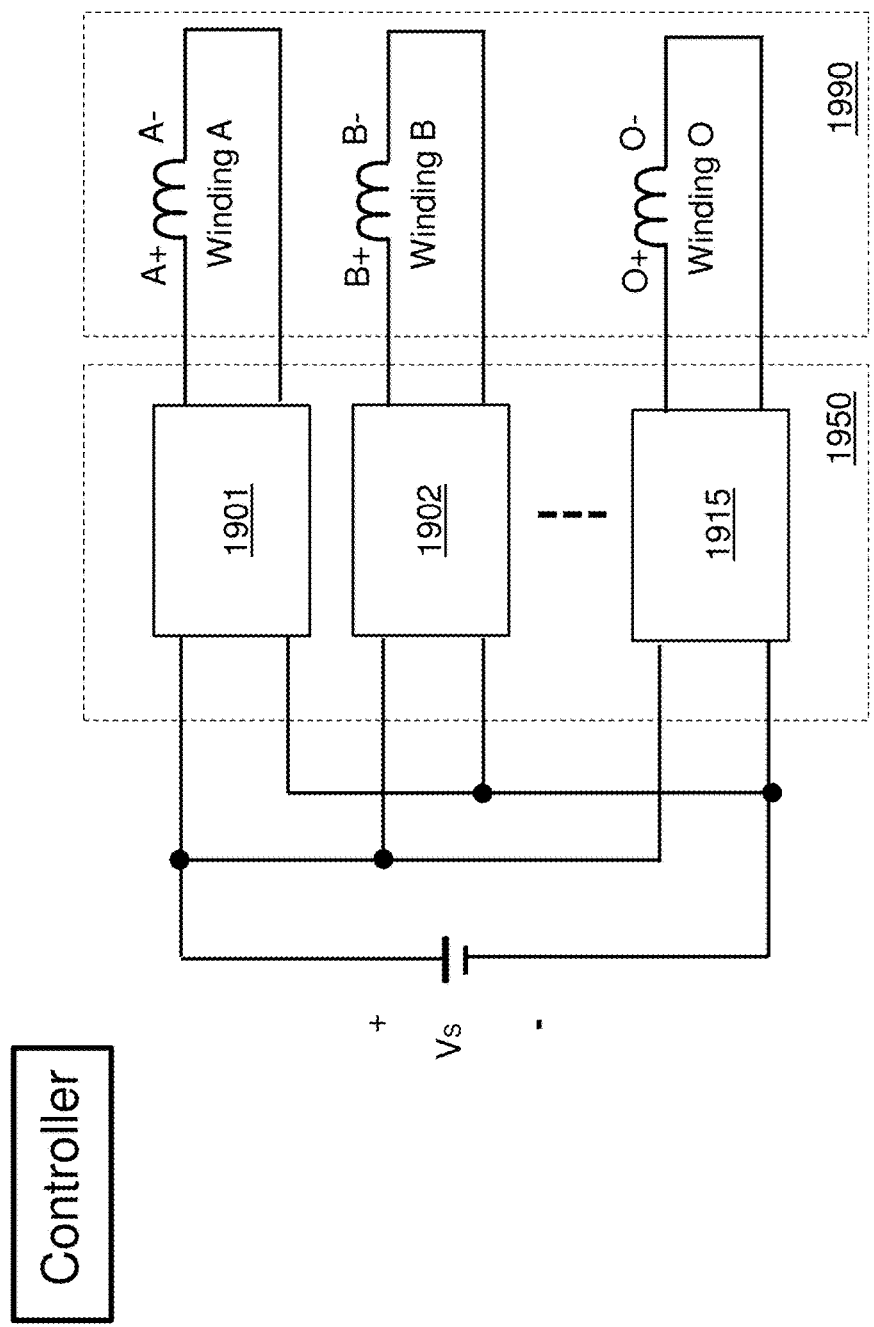
FIG. 19 illustrates a third block diagram of a motor drive system in accordance with various embodiments of the present disclosure.

Various topologies can be used in the power converters. FIG. 19 shows a configuration wherein both leads (terminals) of a phase winding are coupled to its associated power converter, so a full-bridge type of topology can be used.

The motor systems shown may be configured to dynamically change the number of poles and/or number of phases of the motor through adjusting the phase angels of the winding currents and/or disabling the operation of certain windings through controlling the power converters. One of the key objectives of the motor system is to obtain the best system energy efficiency by coordinating the operation of the motor and the power converters through controlling the amplitude, frequency and phase angle of the motor phase currents (the currents flowing through the phase windings). Moreover, a power loss of a key component in the system, or the combined power loss of the system including any combinations of the power converter loss, motor winding losses, motor magnetic material power losses and other losses, may be minimized over an intended range of operating conditions. The power converters should be configured to maintain an approximately smooth and even magnetic field distribution across each airgap even if there is mechanical asymmetry or other defects by regulating the voltage or current of the phase windings properly. For example, in induction machines, it is easier to achieve a smooth the strength of magnetic field in the airgap by controlling the voltages of the phase windings if the airgap is uneven, and thus the controller in a power converter may set the amplitude of voltage reference for each phase to be approximately the same. On the contrary, it may be better to control the currents of phase windings to have the same amplitude for PM machines for the same purpose. Also, harmonic injection (especially third order harmonic injection which allows a higher fundamental component with the same peak value of the overall waveform) should be used to improve the performance of the system. At low-speed high-torque applications, it is better to apply harmonic injection to the flux (for example, through magnetizing current control) to avoid or reduce magnetic saturation. At high speed operation where the performance of the system is more limited by available voltage, it is better to apply harmonic injection to the phase voltages, to increase the voltage amplitude at the fundamental frequency. As the flux saturation is reduced at higher number of poles, in a system where the number of poles of the motor is adjustable, a configuration with a high number of poles can be used when very high torque (and thus high flux) is needed. Therefore, the harmonic injection strategy and pole number can be dynamically adjusted in coordination according to operation requirements and conditions, particularly torque, speed, and dc link voltage.

Figure 20:
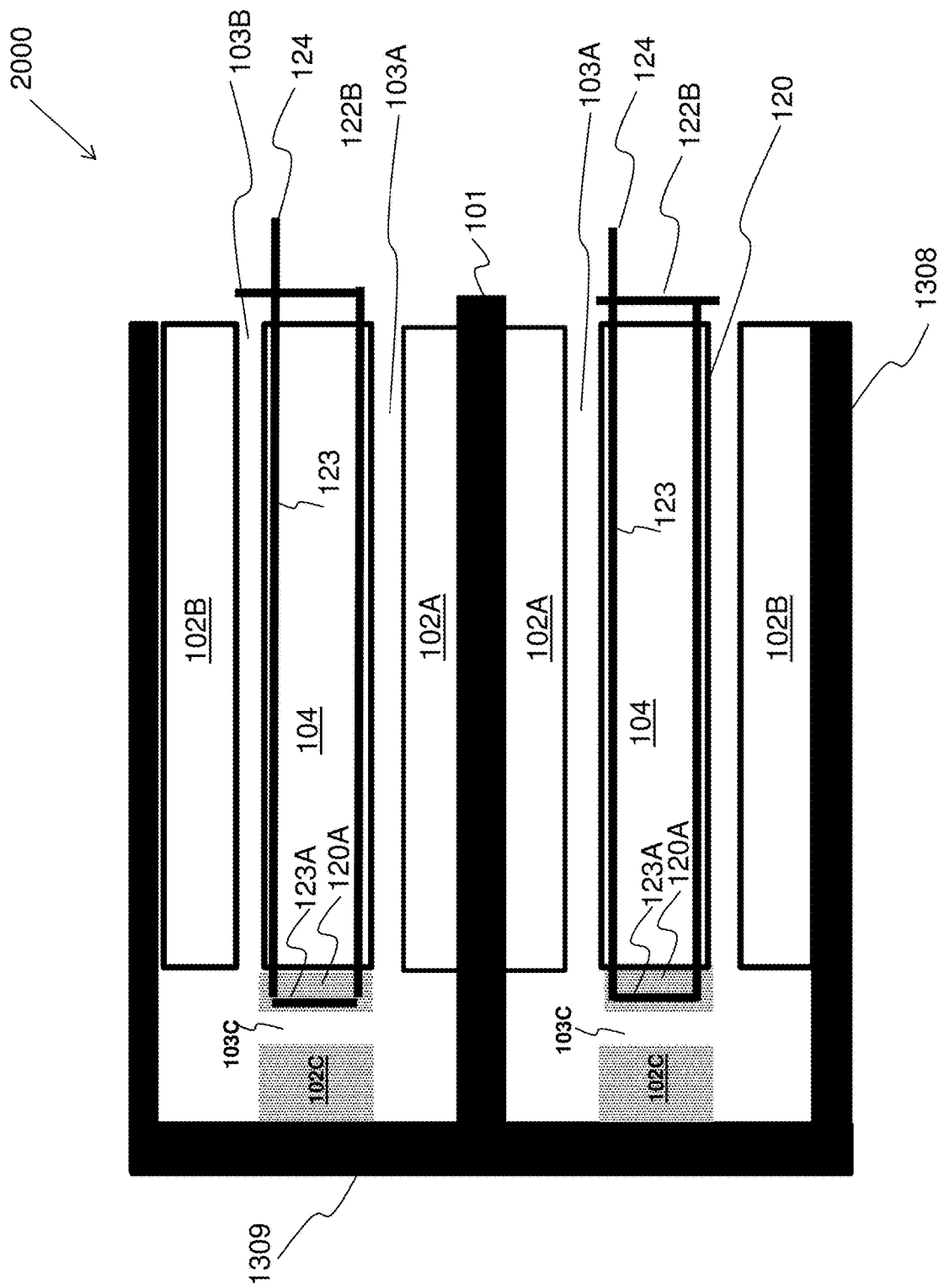
FIG. 20 illustrates a simplified side view of a motor with both radial and axial airgaps in accordance with various embodiments of the present disclosure.

FIG. 20 shows a configuration where an end stator core 120A is attached to the end of stator core 120 to facilitate the operation of the axial rotor 103C, which are applicable to various structures, such as those shown in FIGS. 13, 14 and 20. The material of the end stator core 120A may be the same as or different from that of the main rotor 100. The shape of the end stator core 120A may be configured to shape a good magnetic field in airgap 103C. In some embodiment, the end stator core 120A may be integrated with the main stator core 120. For example, cores 120 and 120A may be molded and baked into shape as a single piece from magnetic compounds such as ferrite or iron power.

Figure 21:
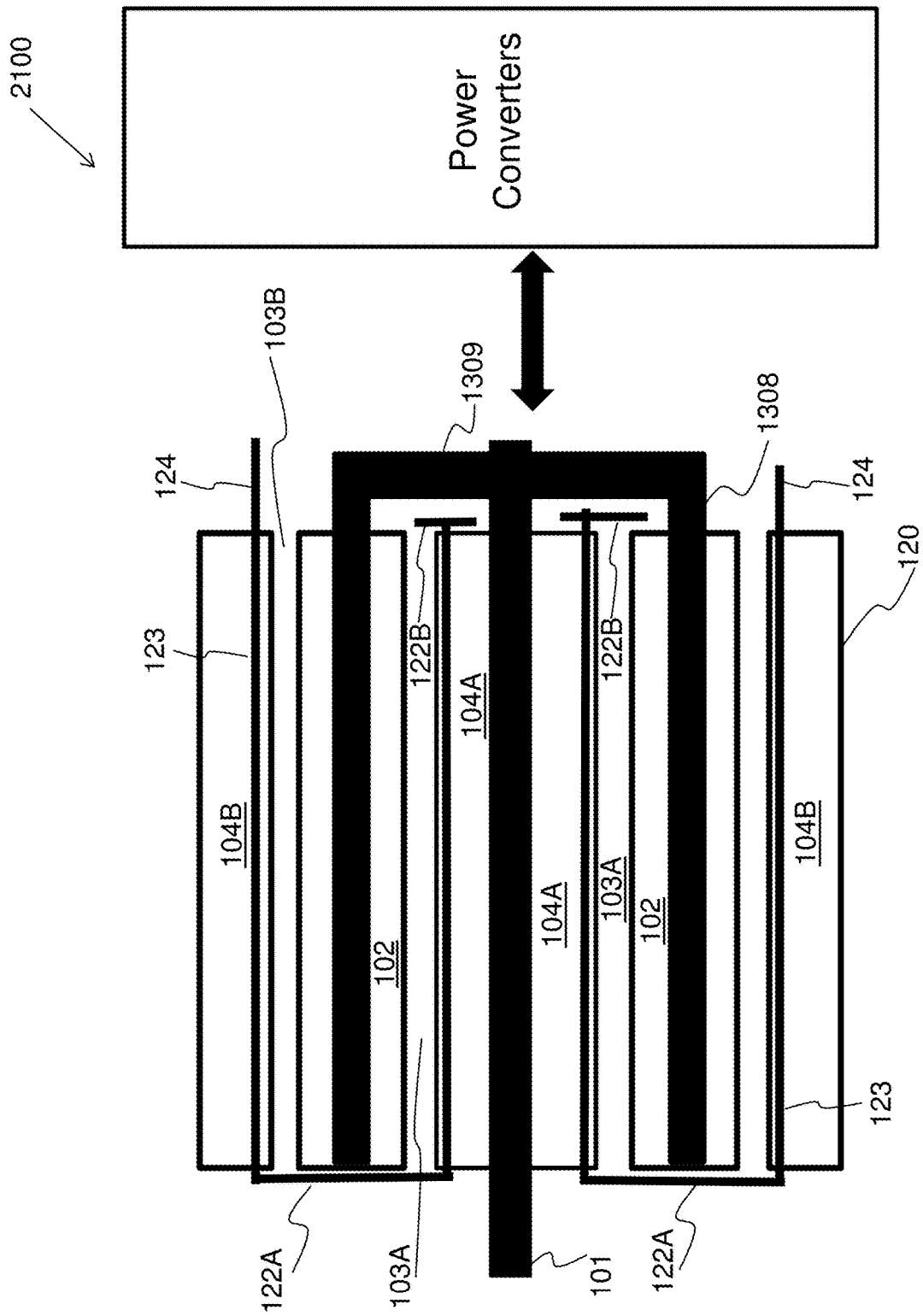
FIG. 21 illustrates a perspective view of a multi-airgap motor drive system with an outer stator topology in accordance with various embodiments of the present disclosure.

The innovation in this disclosure is also applicable to have a machine with multiple stators. FIG. 21 shown a configuration with multiple stators. The motor in the system 2100 has an inner stator 100A and an outer stator 100B. Stator windings are arranged radially, each having conductors in both the inner stator 100A and outer stator 100B. The winding connection 122B in inner stator 100A are arranged to connect the windings without interfering with the rotor 102. The power terminals 124 are connected to stator windings in outer stator 100B, and can be connected to power sources such as power converters, which may be located inside or outside the housing of the motor, without interfering with the rotor 102.

In the discussion about dynamic reconfiguration technology above, it is assumed that the rotors are able to follow the dynamic reconfiguration in the stator or stators automatically. This is true if the rotor is an induction type. However, machines in other types may also use a dynamical reconfiguration principle similar to DRIM. One example is switched reluctance machines. The rotor of a switched reluctance machine comprises salient poles without any power windings. In the switched reluctance machines, the stator has more salient magnetic features. The winding currents of the switched reluctance machine can be controlled to change the number of poles in the stator dynamically in operation to optimize the system performance over a wide range. Another example is memory-effect permanent magnet machines, where the number of poles may also be changed with the memory-effect magnets, so the number of poles in the windings can be dynamically reconfigured accordingly.

Figure 22:
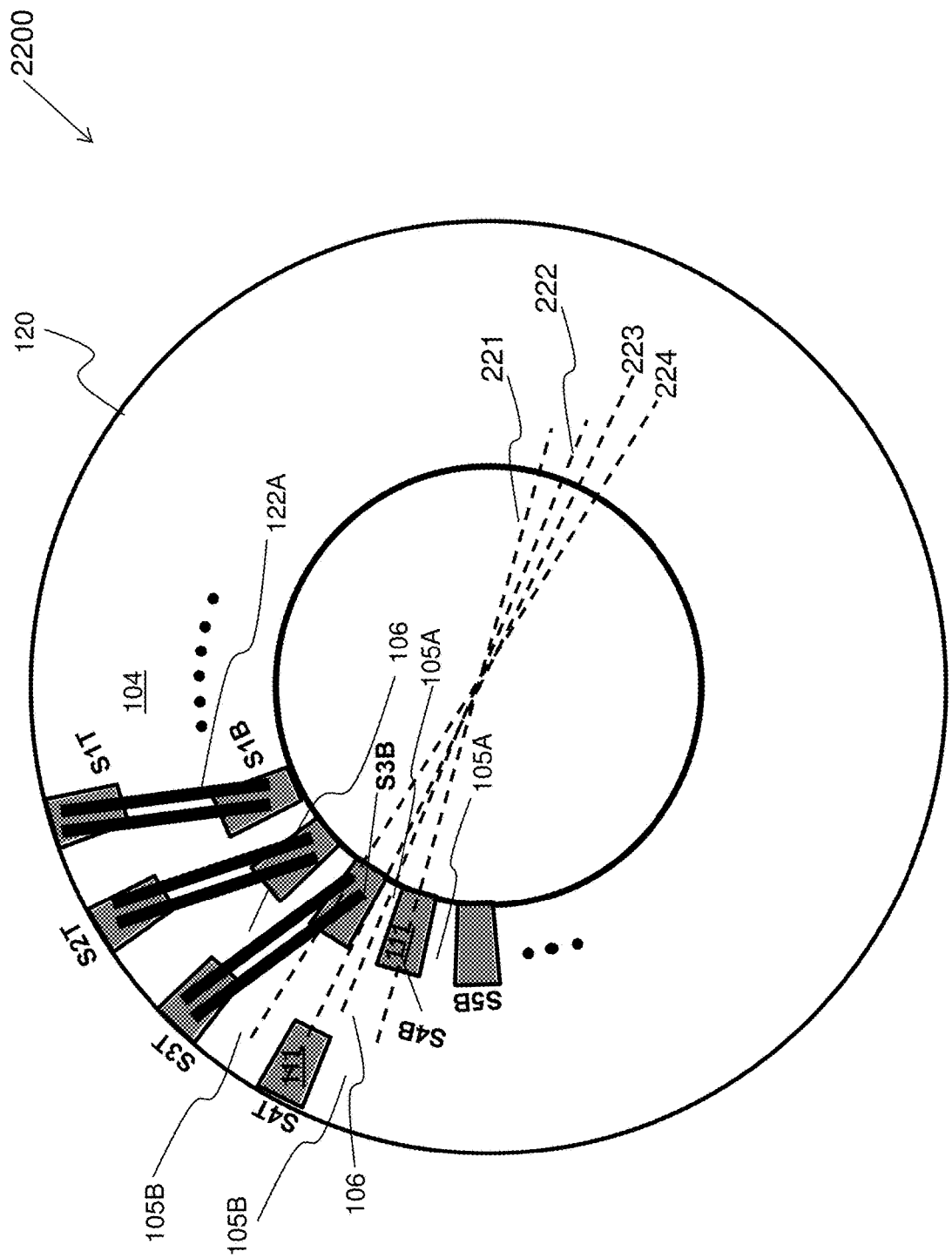
FIG. 22 illustrates a perspective view of part of a stator with an angular offset between first teeth and second teeth in a multi-airgap motor in accordance with various embodiments of the present disclosure.

As discussed above with regard to FIG. 3, it may be advantageous to have an angular offset between the first teeth and the second teeth (and thus the first slots and second slots) of the stator. In a radial flux motor, the first teeth and the second teeth may be distributed along the inner surface and the outer surface of the stator, respectively. In an axial flux motor, the first teeth and the second teeth may be distributed along the left surface and the right surface of the stator, respectively. Usually, the first teeth (and first slots) are distributed evenly along the first surface, while the second teeth (and second slots) are distributed evenly along the second surface. Also, the number of the first teeth (slots) is generally equal to the number of second teeth (slots), although it is also possible that the number of the first teeth (slots) is different from the number of the second teeth (slots). FIG. 22 shows more details of an angular offset using a radial flux motor as example. FIG. 22 shows a side-view drawing of a stator 120 similar to in FIGS. 3 and 10, but only a smaller portion is shown to illustrate more details easier. The centerline of first slot S4B is shown as 221. The centerline of second slot S4T is shown as 223. There is a slot offset between 221 and 223. Each slot is formed between two neighboring teeth and a yoke area 106. For example, each first slot is formed between two first teeth 105A and a yoke area 106, and each second slot is formed between two second teeth 105B and a yoke area 106. A yoke area 106 also separates a first tooth and/or slot from a nearby second teeth and/or slot. Similarly, the centerline of first tooth 105A is shown as 222. The centerline of a second tooth 105B is shown as 224. There is a tooth offset between 222 and 224. If the slots and teeth are evenly distributed, the slot offset is equal to the tooth offset. The conductors 111 in a first slot are called first conductors, and the conductors 111 in a second slot are called second conductors. First conductors and second conductors are arranged into windings, which are coupled to power converters or inverters to control currents and torque of the motor as discussed previously.

Please note that the numbering of slots is associated with winding connection or current relationship. For example, the second conductors in S1T and the first conductors in S1B carry currents with the same (or approximately the same, such as within 10% tolerance) amplitude but in reverse directions, and similarly the second conductors in S2T and the first conductors in S2B carry currents with the same or approximately the same amplitude but in reverse directions. This current relationship may be enforced by physical connections as is shown in the FIG. 22 where the end connections between S1T and S1B, S2T and S2B, and S3T and S3B put first conductors in a first slot (or a group of first slots) in series with second conductors in a corresponding second slot (or a corresponding group of second slots). If needed, parallel connections and series-parallel connections may also be used to establish proper current relationship between first conductors and their corresponding second conductors. This requires that each winding is formed by connecting first conductors and corresponding second conductors together. Alternatively, there may be no physical connection between the first conductors in a first slot (slots) and the second conductors in a corresponding second slot (slots), but proper current control of power converters coupled to the first conductors and their corresponding second conductors is configured to enforce the current relationship. This means that the first conductors in a first slot do not have to be connected to the second conductors in the corresponding second slot to form a winding. Instead, a winding may be formed using only first conductors or second conductors along one surface, as usually in conventional single-air-gap motors. Optionally, such a first-conductor-only winding may be connected in series or in parallel with a correspond second-conductor-only winding so their currents have the same amplitude but opposite directions. This kind of flexibility gives more freedom in the winding arrangement.

Figure 23:
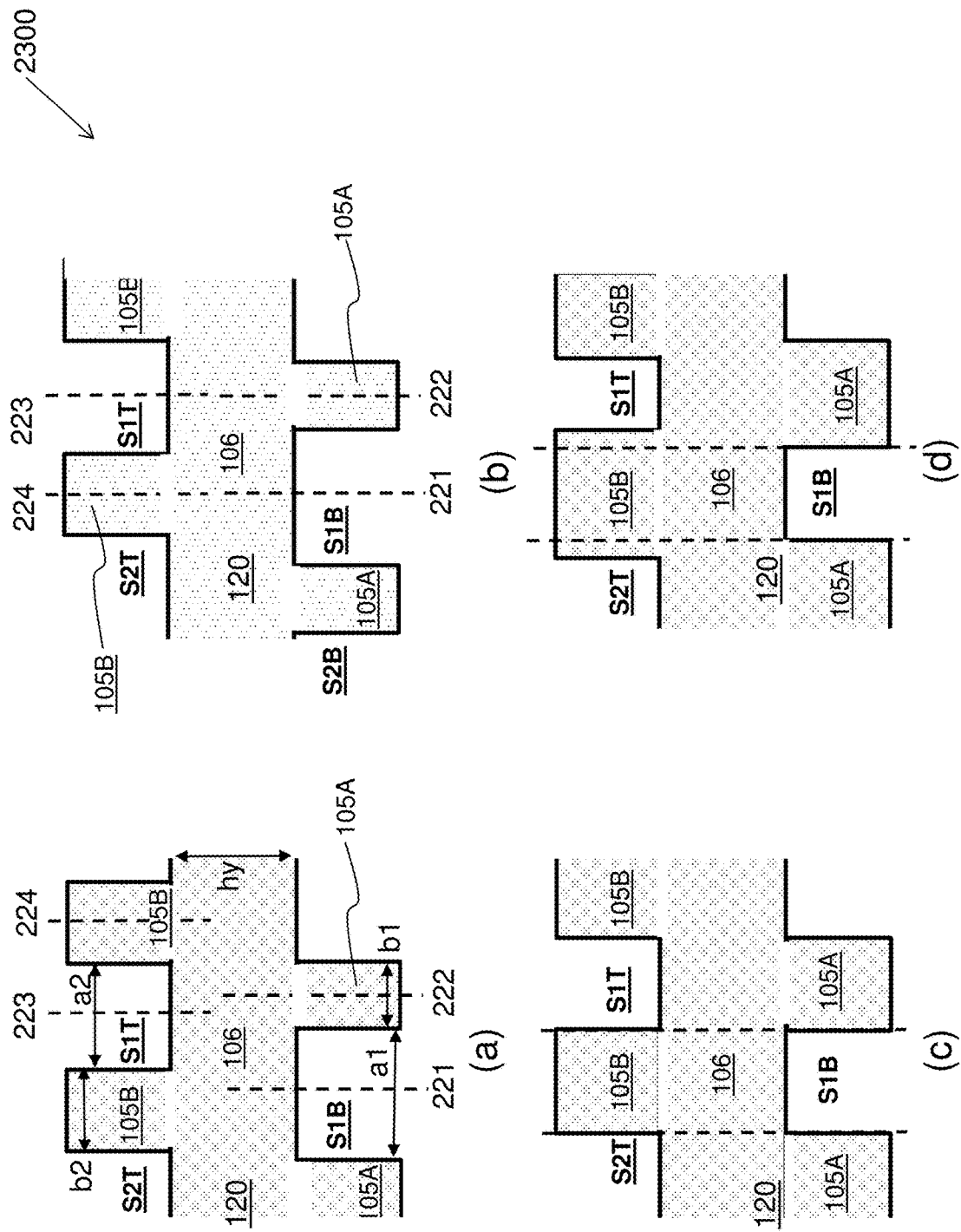
FIG. 23 illustrates perspective straightened out views of part of a stator in a multi-airgap motor in accordance with various embodiments of the present disclosure.

To show the angular offsets more clearly, FIG. 23 illustrates a portion of the stator 120 in a straightened out fashion, which is basically an aspect view of a small portion of the stator as if the radius of the shown area is infinitely large, so the slots and teeth are uprightly shaped, the yoke area 106 as well as tooth areas become horizontal rectangles, and the centerlines become vertical lines. As a result, an angular offset is shown as horizontal distance. For example, the center line of the first slot S1B becomes a vertical line 221. The centerline of its first tooth becomes a vertical line 222. The center line of second slot S1T becomes a vertical line 223. The centerline of its second tooth becomes a vertical line 224, as is shown in FIG. 23(a). Please note that the width of the first teeth, b1, is shown to be different from the width of the second teeth (b2), although if needed the first teeth and second teeth may have an equal width. Similarly, the width of the first slots, a1, is shown to be different from the width of the second slots (a2), although if needed the first slots and second slots may have an equal width. With an angular offset between the first teeth and the second teeth (as well as between the first slots and the second slots), the magnetic structure of the first rotor should has a similar offset with the magnetic structure of the second rotor, if the rotors have magnetic structures (such as poles) on them. As a result of having non-aligned first teeth and second teeth, the maximum value (peak value) of magnetic flux in the yoke may be reduced, which leads to a smaller yoke and higher performance such as better torque/power density and lower power loss. Also, as the ac components (ripple) of the torque and power output produced by the first submotor and the second submotor now have a phase shift between them (i.e. the torque ripple of the first submotor and the second submotor is no longer lined up in time), the ripple of the combined torque output from the first submotor and the second submotor is reduced by this angular offset arrangement of magnetic structures, resulting in less noise and vibration. Further measures can be taken to enhance the improvement from the angular offset further.

To achieve a high performance, it is advantageous to use the angular offset (slot offset and/or tooth offset) to minimize the ripple of the total torque caused by the tooth-slot effects of the stator, by making the ripple components of the two (or more) submotors to have a proper phase shift (such as 180°) to even out or cancel out each other. One way to achieve this is to align the centerline of a first slot with the center line of a second tooth, and the center line of a first tooth with a centerline of a second slot, as is shown in FIG. 23(b), where centerlines 221 and 224 are aligned to each other, and 222 and 223 are aligned to each other. This is called an interleaving arrangement, in which the first teeth are interleaved with the second teeth spatially, and the first slots are interleaved with the second slots spatially. The resulting angular offset is basically half of a pitch (which is the distance or angle difference between the centerlines of two neighboring teeth or slots). This is a half-pitch interleaving arrangement, i.e. the first teeth and the second teeth (and also the first slots and the second slots) have an angular offset of 0.5 pitch, which indicates an interleaving pitch of 0.5 and usually makes the torque pulsation (i.e. the ripple components) from the tooth-slot effect on the two surfaces of the stator to be in opposite directions and thus cancel each other, resulting in a much smaller ripple and pulsation of the combined torque. FIG. 23(b) shows a situation when the width of the first slot is bigger than the width of the second tooth, so along the circumference of the yoke there are areas where the angular position of a first slot and the angular position of a second slot overlaps, i.e. in some sections (or areas) along the yoke the height of the core (i.e. the distance between the first surface and the second surface) becomes very small (i.e. equal to the yoke height hy). In these sections, flux density tends to increase significantly, so to avoid magnetic saturation the yoke height hy may have to be increased, reducing the power and torque density, as well as power losses, of the motor. To avoid the resulting performance, cost, weight and volume penalty, the width of the first slots and the second teeth (and also the width of the first teeth and the second slots) may be coordinated such that along the circumference of the yoke the first teeth and the second slots are lined up, which naturally makes the first slots and the second teeth also lined up, as is shown in FIG. 23(c). In such an aligned arrangement, any yoke area is covered by either a second teeth or a first teeth, so the tooth-slot effect of the motor may be reduced very significantly, while the averaged torque output may be significantly increased as the height of the yoke may be reduced resulting in higher power/torque density. Alternatively, the width of the second teeth may be slightly bigger than the width of the first slots, and the width of the first teeth may be slightly bigger than the width of the second slots, as is shown in FIG. 23(d). This is an over-aligned arrangement, in which the height of the yoke may be further reduced. Also, the resulting bigger tooth area may be used to mechanically attach the stator to a housing of the motor. For example, mount holes can be punched in the tooth areas so rods can be inserted into the mount holes to mechanically attach the stator to a housing.

Figure 24:
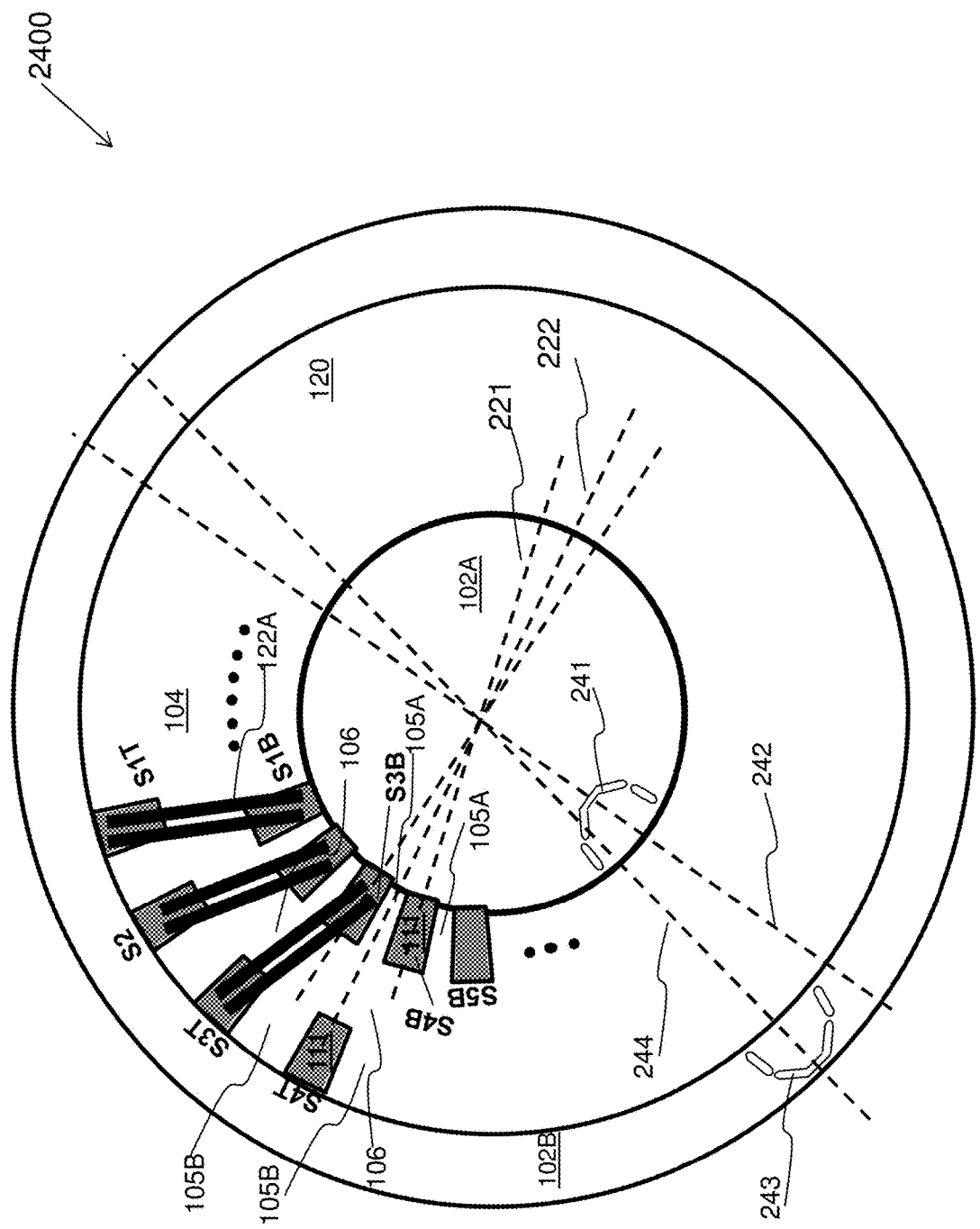
FIG. 24 illustrates a perspective view of part of a stator and two rotors with interleaved first teeth and second teeth as well as interleaved rotor poles in a multi-airgap motor in accordance with various embodiments of the present disclosure.
Figure 25:
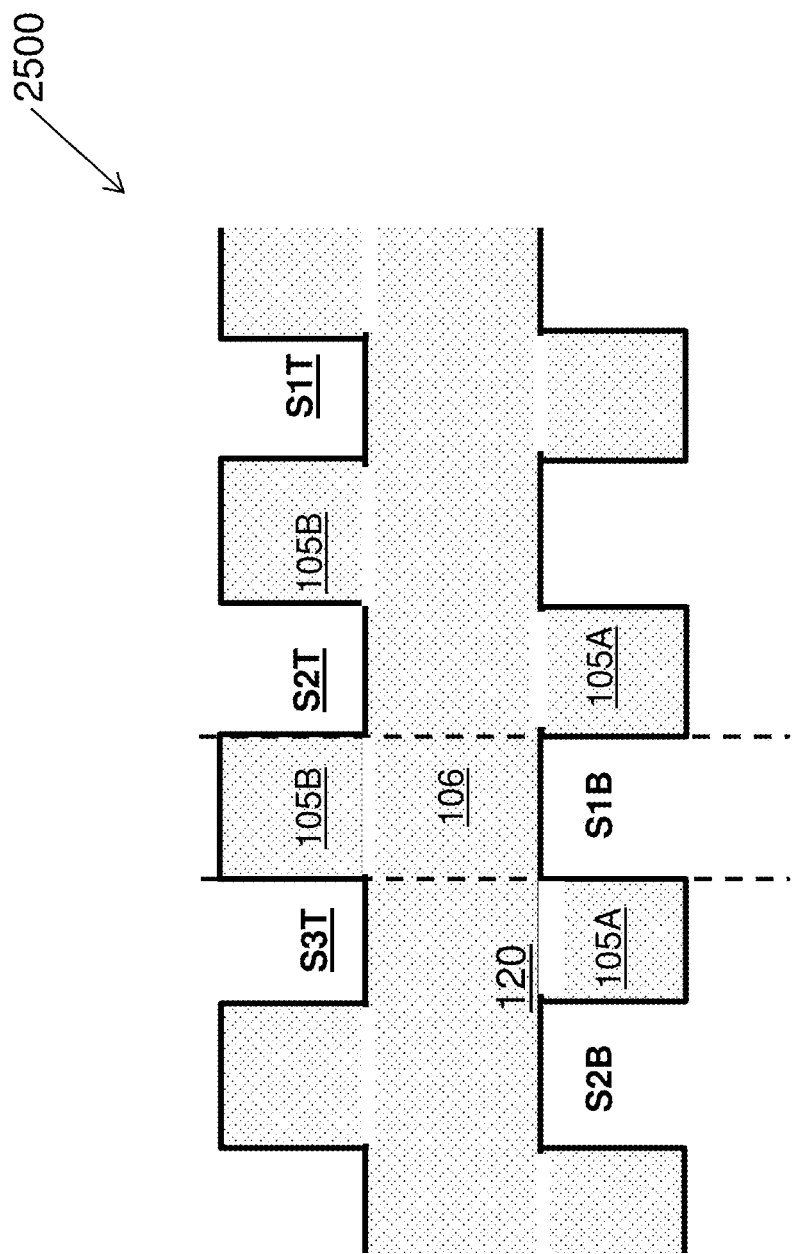
FIG. 25 a perspective straightened out view of part of a stator with a higher interleaving pitch in a multi-airgap motor in accordance with various embodiments of the present disclosure illustrates.

With the first slots along the inner surface of the stator and the second slots along the outer surface of the stator interleaved, the magnetic field generated by the first conductors (i.e. the conductors in the first slots) in the first air gap (i.e. the air gap between the stator and the first rotor) naturally has a phase shift against the magnetic field generated by the second conductors (i.e. the conductors in the second slots) in the second air gap (i.e. the air gap between the stator and the second rotor), which can be viewed as equivalently the following: the first conductors along the first surface (the inner surface) of the stator has an angular offset against the second conductors along the second surface (the outer surface) of the stator. This phase shift can be used to reduce the torque ripple caused by the tooth-slot effect in the stator as discussed above. Moreover, it can also be used to reduce torque pulsation of the motor caused by reluctance change along the air gaps. To achieve this goal, the magnetic structures on the rotors may have an angular offset equal to or approximately equal to the angular offset between the first conductors and the second conductors as mentioned earlier, so that the currents in the first conductors and the second conductors can be easily controlled to have good performance simultaneously from the submotors of the motor. As a special case, the first conductors and the second conductors may be wound into a set of windings so the currents in a group of first conductors will have the same value but opposite directions as the currents in a group of corresponding second conductors. Especially, if the rotors have significant reluctance change along the air gaps as in an IPM, wound field synchronous, synchronous reluctance or switching reluctance rotor, the poles on the rotors may be configured with a proper offset to enhance torque performance, as the reluctance torque of the two different rotors will have a phase shift between them, allowing a good reduction of the pulsation (ripple) of the combined reluctance torque and thus the total torque from different rotors. This alleviates a significant shortcoming of these motor topologies. For example, for an 8-pole rotor, if there are 16 slots on each surface of the stator, the half-pitch interleaving arrangement shown in FIGS. 23(b) through (d) can make the ac components of the reluctance torque from the two submotors have a phase shift of about 180° and thus cancel (or reduce) each other, thus significantly lowering the torque pulsation of the motor. FIG. 24 shows an example of coordinating a magnetic structure 241 (e.g., a pole with or without permanent magnet) of the first rotor and the corresponding magnetic structure 243 (e.g., a corresponding pole with or without permanent magnet) of the second rotor with the stator to improve the torque performance of the system. Please note that the shapes and constructions of magnetic structures 241 and 243 are illustrated merely as examples, and other shapes and constructions, such as found in various SPM, IPM, wound-field, switching reluctance and synchronous reluctance motors, may also be used. The center line 242 of the magnetic structure 241 has an angular offset with the center line 244 of the magnetic structure 243, and this angular set can be called a pole offset, which may be the same as or different from the slot offset or tooth offset on the stator, but should be equal to or approximately equal to the offset between a group of first conductors and the corresponding second conductors to allow reaching good torque performance from both the first rotor and the second rotor simultaneously with simple current control of the first and the second conductors. Since usually the number of first or second slots is much higher than the number of poles in a motor, it is generally desirable that a bigger pole offset be used. FIG. 25 shows a configuration that the angular pole offset is increased to 1.5 pitches which leads the first conductors to have also an angular offset of 1.5 pitches with their corresponding second conductors, as illustrated by the offset between a first slot and its corresponding second slot (e.g., between S1B/S1T pair, S2B/S2T pair, etc.). This illustrates that the interleaving pitch is 1.5. With this higher interleaving pitch, the magnetic poles in the first rotor and the second rotor can have also an offset of 1.5 pitches. Therefore, the stator can have 48 first slots and 48 second slots with an angular offset of 1.5 pitches, and the ripple of reluctance torque generated by the first rotor and the second rotor may have an offset of 180° and can reduce or approximately cancel each other, so the combined total torque of the motor has very little pulsation. If needed, even higher interleaving pitch, such as 2.5 or 3.5, may be used, and the interleaving pitch should be selected to meet the performance requirements of the motor based on the number of poles and number of the first (second) slots. Generally, the interleaving pitch can be N or N.5, where N is an integer (including 0). If desired, the 0.5 interleaving pitch causes the tooth-slot effect along different surfaces of the stator to cancel or reduce each other, and N be used to reduce the ripple of the combined torque output of multiple rotors from reluctance torque. Please note that for different N, the magnetic core shape of the stator (i.e. the teeth and slots together with yoke) is the same, as N only changes the connection of first conductors and the corresponding second conductors (or the numbering of first slots and second slots), which should be the same as the pole offset between magnetic structures of the first rotor and the second rotor. By using a proper interleaving offset in the format of N.5, the torque pulsation from both the tooth-slot effect of the stator and the reluctance change of the rotors can be reduced, leading to excellent noise and vibration performance of the motor. The significant reduction of torque pulsation is especially important for motor topologies with high torque ripple, such as switched reluctance motors or IPM motors. For motor topologies with magnets in the rotor, such as permanent magnets motors, wound field synchronous motors, or reluctance motor with permanent magnets as aids, the poles on different rotors not only can have angular offsets between them, poles in different rotors in corresponding locations (i.e. in roughly the same angular position but with an offset) may also have opposite polarities so the flux generated by the poles mostly flows between these poles without crowding the yoke area, so a smaller yoke height may be used, further improving the torque/power density and reducing the power loss of the motor. The arrangement of opposite polarity poles at the corresponding locations of different rotors is equivalent to using a very high interleaving pitch in the interleaving of magnetic structures on different rotors. The interleaving arrangement of magnetic structures on different rotors and/or different surfaces of a rotor or a stator, which may include features such as teeth, slots, poles, barriers, or openings, can be applied to motors with more than 1 air gaps, either in multi-rotor or multi-stator topologies.

Although radial flux motors are discussed as examples, the innovative aspects of the above discussion can be applied to axial flux motors. The discussion above uses one set of the stator windings as examples. The same principle is also applicable to motors and generators with more than one set of stator windings, such as certain double-fed motors and generators. Also, the same principles can be applied to rotor windings if needed. Although most discussions use distributed windings as examples, the technologies disclosed herein can also be used with concentrated windings where partial slots are not needed.

Although the discussion above is generally based on motors, the techniques can be applied to generators or motors working in generating (regenerative) mode.

The discussion in this disclosure refers to motors and generators. The technology can be extended to actuators such as magnetic gears and other applications.

The discussion above is generally based on machines with cores and slots. However, it can be applied to machines without cores (air-core machines) and/or without slots (slotless machines). In a slotless machine, the conductors or conductor assemblies are evenly distributed along a perimeter in a machine as if there were evenly distributed slots, so the winding arrangements discussed in the present disclosure can still be used.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
a stator with a first surface and a second surface, wherein:
a plurality of first slots each containing a plurality of first conductors is distributed along the first surface and is separated from each other by a plurality of first teeth;
a plurality of second slots each containing a plurality of second conductors is distributed along the second surface and is separated from each other by a plurality of second teeth, and wherein each second tooth is separated from a close-by first tooth by a yoke area, and the plurality of first teeth are interleaved with the plurality of second teeth; and
a plurality of windings is configured using the plurality of first conductors and the plurality of second conductors; and
a plurality of rotors magnetically coupled to the stator, wherein a first rotor of the plurality of rotors faces the first surface of the stator through a first airgap and a second rotor of the plurality of rotors faces the second surface of the stator through a second airgap, wherein:
the plurality of first conductors, the first airgap, and the first rotor form a first submotor; and
the plurality of second conductors, the second airgap, and the second rotor form a second submotor, and wherein the first rotor and the second rotor are configured to produce mechanical torque in a same direction when currents flow in the plurality of windings in an operation mode.

2. The apparatus of claim 1, wherein:
the first submotor and the second submotor are configured to have a similar electro-magnetic characteristics; and
a length of the first airgap and a length of the second airgap are configured for a proper torque split between the first rotor and the second rotor.

3. The apparatus of claim 1, wherein:
the first submotor and the second submotor are synchronous motors, and wherein a magnetic structure of the first rotor and a corresponding magnetic structure of the second rotor are interleaved with a pole offset, and the plurality of first conductors are coordinated with the plurality of second conductors to reduce a pulsation of combined torque produced by the first submotor and the second submotor.

4. The apparatus of claim 3, wherein
The pole offset is in a format of N.5 pitches, wherein N is an integer including 0, and the apparatus is configured to reduce the pulsation of the combined torque from both tooth-slot effect and reluctance torque.

5. The apparatus of claim 3, wherein:
a pole of the first rotor has an opposite polarity to a pole at a corresponding location of the second rotor.

6. The apparatus of claim 3, wherein:
one of the plurality of windings comprises a group of first conductors in a group of first slots connected with a group of second conductors in a corresponding group of second slots, and wherein the group of first slots and the corresponding group of second slots have an angular offset approximately equal to the pole offset.

7. The apparatus of claim 1, wherein:
the number of poles of at least one of the first submotor and the second submotor is dynamically adjustable by controlling a phase relationship of currents in neighboring windings.

8. The apparatus of claim 1, wherein:
the first submotor and the second submotor are induction motors; and
the first submotor and the second submotor are configured to reach their respective maximum mechanical torques approximately at a same slip frequency in the operation mode.

9. The apparatus of claim 1, wherein:
the predetermined angular tooth offset, a width of the plurality of first teeth and a width of the plurality of second teeth are configured to reduce maximum flux in the yoke area or a pulsation of output torque of the apparatus.

10. A system comprising:
a stator with a first surface and a second surface, wherein:
a plurality of first slots each containing a plurality of first conductors is distributed along the first surface and is separated from each other by a plurality of first teeth;
a plurality of second slots each containing a plurality of second conductors is distributed along the second surface and is separated from each other by a plurality of second teeth, and wherein each second tooth is separated from a close-by first tooth by a yoke area, and the plurality of first teeth are interleaved with the plurality of second teeth; and
a plurality of windings is configured using the first conductors and the second conductors;
a plurality of rotors magnetically coupled to the stator, wherein a first rotor faces the first surface of the stator through a first airgap and a second rotor faces the second surface of the rotor through a second airgap, wherein:
the plurality of first conductors, the first airgap, and the first rotor form a first submotor; and
the plurality of second conductors, the second airgap, and the second rotor form a second submotor; and
a plurality of power converters coupled to the plurality of windings, wherein the plurality of power converters are configured to control currents in the plurality of windings so that the first rotor and the second rotor produce mechanical torque in a same direction in an operation mode.

11. The system of claim 10, wherein:
the first submotor and the second submotor are synchronous motors, and wherein a magnetic structure of the first rotor and a magnetic structure of the second rotor are coordinated with a magnetic structure of the stator, and the system is configured to reduce a pulsation of combined torque produced by the first submotor and the second submotor.

12. The system of claim 10, wherein:
a width of the plurality of first teeth and a width of the plurality of second teeth are configured to reduce maximum flux in the yoke area or a pulsation of output torque of the system.

13. The system of claim 10, wherein:
the plurality of windings comprises a plurality of first windings and a plurality of second windings, and wherein each first winding comprises first conductors in a group of first slots but no second conductors, and each second winding comprises second conductors in a corresponding group of second slots but no first conductors, and wherein the group of first slots and the corresponding group of second slots have an angular offset equal to the pole offset, and the power converters are configured such that currents of the first conductors in the group of first slots have the same or approximately the same amplitude but an opposite direction as currents of the second conductors in the corresponding group of second slots.

14. The system of claim 13, wherein:
one of the plurality of first windings comprises first conductors in the group of first slots and is connected in series or in parallel with one of the plurality of second windings comprising corresponding second conductors in the corresponding group of second slots.

15. A method comprising:
providing a stator with a first surface and a second surface, wherein:
 a plurality of first slots each containing a plurality of first conductors is distributed along the first surface and is separated from each other by a plurality of first teeth; and
 a plurality of second slots each containing a plurality of second conductors is distributed along the second surface and is separated from each other by a plurality of second teeth, and wherein each second tooth is separated from a close-by first tooth by a yoke area, and the plurality of first teeth are interleaved with the plurality of second teeth;

arranging a plurality of windings using the first conductors and the second conductors;
providing a plurality of rotors magnetically coupled to the stator, wherein a first rotor of the plurality of rotors faces the first surface of the stator through a first airgap and a second rotor of the plurality of rotors faces the second surface of the stator through a second airgap; and
configuring the plurality of first conductors, the first airgap, and the first rotor to form a first submotor, and the plurality of second conductors, the second airgap, and the second rotor to form a second submotor, so that the first rotor and the second rotor produce mechanical torque in a same direction in an operation mode.

16. The method of claim 15, wherein:
the first submotor and the second submotor have a similar electro-magnetic characteristics, and wherein a length of the first airgap and a length of the second airgap are configured to achieve a proper split of power between the first submotor and the second submotor.

17. The method of claim 15, further comprising:
configuring one of the plurality of first teeth to have a different width from that of one of the plurality of second teeth.

18. The method of claim 15, further comprising:
configuring a width of the plurality of first teeth and a width of the plurality of second teeth to reduce maximum flux in the yoke area or a pulsation of combined torque from the first rotor and the second rotor.

19. The method of claim 15, further comprising:
arranging a third rotor facing an end of the stator and separated from the end of the stator through a third airgap.

20. The method of claim 15, wherein:
the first submotor and the second submotor are synchronous motors, and wherein a magnetic structure of the first rotor and a magnetic structure of the second rotor have a pole offset and the plurality of windings are arranged in coordination with a pole offset such that a pulsation of combined torque produced by the first submotor and the second submotor from tooth-slot effect and reluctance torque is reduced.

* * * * *